(12) United States Patent
Gillin

(10) Patent No.: US 10,953,931 B2
(45) Date of Patent: *Mar. 23, 2021

(54) FLOORING APPARATUS AND METHOD OF MANUFACTURE

(71) Applicant: Kyle R. Gillin, Van, TX (US)

(72) Inventor: Kyle R. Gillin, Van, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/665,671

(22) Filed: Oct. 28, 2019

(65) Prior Publication Data

US 2020/0055551 A1   Feb. 20, 2020

Related U.S. Application Data

(63) Continuation of application No. 15/261,575, filed on Sep. 9, 2016, now Pat. No. 10,457,336.

(60) Provisional application No. 62/216,977, filed on Sep. 10, 2015.

(51) Int. Cl.
   *B62D 33/02* (2006.01)
   *B62D 63/06* (2006.01)
   *B62D 65/02* (2006.01)

(52) U.S. Cl.
   CPC .............. *B62D 33/02* (2013.01); *B62D 63/06* (2013.01); *B62D 65/02* (2013.01)

(58) Field of Classification Search
   CPC ... B62D 33/02; B62D 63/08; E04F 15/02166; E04F 15/04; Y10T 428/24331; Y10T 428/24612; Y10T 29/49826; Y10T 29/49947

USPC .......... 280/789; 296/184.1, 191, 204, 193.07
See application file for complete search history.

(56) References Cited

U.S. PATENT DOCUMENTS

| | | |
|---|---|---|
| 2,009,595 A | 7/1935 | Van Der Pyl |
| 2,497,837 A | 2/1950 | Nelson |
| 3,334,456 A | 8/1967 | Naka |
| 4,288,957 A | 9/1981 | Meehan |
| 4,905,431 A | 3/1990 | Davis |
| 5,332,602 A | 7/1994 | Barre et al. |
| 5,461,836 A | 10/1995 | Yang |
| 5,508,084 A * | 4/1996 | Reeves .............. B29C 37/0053 428/172 |

(Continued)

OTHER PUBLICATIONS

U.S. Appl. No. 15/876,820, filed Jan. 22, 2018, Flooring Apparatus.

(Continued)

*Primary Examiner* — Toan C To
(74) *Attorney, Agent, or Firm* — Foley & Lardner LLP

(57) ABSTRACT

A flooring apparatus and method of making the same are provided. The apparatus and method, in one embodiment, may include providing an elongated member having a top surface. A first adhesive is deposited about a perimeter of the top surface of the elongated member. A second adhesive is deposited within the perimeter of the top surface of the elongated member, with the second adhesive having a lower viscosity than the first adhesive and being retained within the perimeter by the first adhesive. A friction-increasing member is then heated to a pre-heat temperature. The friction-increasing member is disposed on the first and second adhesive to form the flooring apparatus. The flooring apparatus is then cured at a curing temperature, in one embodiment, that is greater than the pre-heat temperature.

13 Claims, 16 Drawing Sheets

(56) References Cited

U.S. PATENT DOCUMENTS

| | | | |
|---|---|---|---|
| 6,109,684 A | 8/2000 | Reitnouer | |
| 7,350,853 B2 | 4/2008 | Fitze | |
| 7,765,758 B2 * | 8/2010 | Chorney | B62D 25/2054 52/411 |
| 8,118,345 B1 | 2/2012 | Hootman | |
| 8,534,009 B2 | 9/2013 | Kay | |
| 8,950,144 B2 | 2/2015 | Padmanabhan | |
| 9,390,700 B1 * | 7/2016 | Pham | E04B 9/045 |
| 9,786,572 B1 * | 10/2017 | Beaumier | H01L 23/10 |
| 9,873,469 B2 | 1/2018 | Gillin | |
| 10,457,336 B2 * | 10/2019 | Gillin | B62D 65/02 |
| 2002/0142156 A1 * | 10/2002 | Maloney | C09J 7/20 428/343 |
| 2003/0077423 A1 * | 4/2003 | Flanigan | B32B 3/30 428/166 |
| 2003/0126817 A1 * | 7/2003 | Gleeson | A61L 15/58 52/460 |
| 2003/0211291 A1 * | 11/2003 | Castiglione | B32B 7/02 428/172 |
| 2006/0130421 A1 | 6/2006 | Nollet et al. | |
| 2006/0179733 A1 * | 8/2006 | Padmanabhan | B32B 27/20 52/177 |
| 2010/0186321 A1 | 7/2010 | Maw et al. | |
| 2013/0192162 A1 | 8/2013 | Foley et al. | |
| 2013/0196119 A1 | 8/2013 | Dobecz et al. | |
| 2013/0201646 A1 * | 8/2013 | Braun | H05K 5/0282 361/784 |
| 2013/0206335 A1 * | 8/2013 | Renius | C09J 5/00 156/305 |
| 2014/0212637 A1 * | 7/2014 | Syvret | B32B 37/1292 428/201 |
| 2015/0145281 A1 | 5/2015 | Gillin | |
| 2017/0031525 A1 * | 2/2017 | Wilson | G06F 1/1656 |
| 2017/0073022 A1 | 3/2017 | Gillin | |
| 2017/0266929 A1 * | 9/2017 | Wilson | B32B 7/06 |
| 2018/0141599 A1 | 5/2018 | Gillin | |

OTHER PUBLICATIONS

U.S. Appl. No. 15/876,820, Non-Final Office Action dated Apr. 5, 2019, 6 pgs.

U.S. Appl. No. 15/876,820, Non-Final Office Action dated Oct. 25, 2019, 10 pgs.

* cited by examiner

FLOORING APPARATUS AND METHOD OF MANUFACTURE

CROSS-REFERENCE TO RELATED APPLICATIONS

Pursuant to 35 U.S.C. § 119(e), this application is a continuation of U.S. patent application Ser. No. 15/261,575, entitled "Flooring Apparatus and Method of Manufacture," filed Sep. 9, 2016, and naming Kyle Gillin as inventor, which claims priority and is a non-provisional of, U.S. Provisional Patent Application Ser. No. 62/216,977, entitled "Flooring Apparatus and Method of Manufacture," filed Sep. 10, 2015, naming Kyle Gillin as inventor, the disclosures of which are incorporated herein by reference in their entirety.

TECHNICAL FIELD

This disclosure relates in general to a flooring apparatus and, in particular, but not by way of limitation, to a flooring apparatus and method of manufacturing that includes an insert to provide, in some embodiments, improved traction, improved wear resistance, improved structural support, and other benefits to a floor surface.

BACKGROUND OF THE DISCLOSURE

Flooring materials are used in a wide variety of applications including flooring for homes and other buildings, flooring for stairs and other structural elements, and flooring for mobile applications, such as, boats, trailers and other vehicles. The characteristics of the ideal flooring material for a particular application may depend on the type of objects that will be placed on the flooring and the anticipated environment in which the flooring will be used. In the case of flooring for an automobile trailer, for example, the flooring may be used to hold heavy cargo, such as automobiles, construction equipment and storage containers, and may be exposed to the open environment for long periods of time. Wood planks are often used on trailers to provide a light weight and replaceable flooring onto which cargo can be placed. However, it has been found that traditional wood planks have certain disadvantages when used as flooring.

SUMMARY

In a first aspect, there is provided a flooring apparatus that may provide improved traction, improved wear resistance and improved structural support to a floor. In some embodiments, the flooring apparatus includes an elongated member that includes a top surface, a bottom surface and a cutout portion in the top surface that extends along at least a portion of a longitudinal axis of the elongated member. The flooring apparatus may also include an insert positioned at least partially within the cutout portion.

In certain embodiments, the cutout portion includes a floor, a first side wall and a second side wall.

In other embodiments, the first side wall and the second side wall extend at an angle that is less than 90 degrees from the floor.

In another embodiment, the first side wall and the second side wall extend at an angle that is more than 90 degrees from the floor.

In yet another embodiment, the first side wall and the second side all extend at an angle that is about 90 degrees from the floor.

In still another embodiment, the first and second side walls include one or more protrusions to secure the insert at least partially within the cutout portion.

In some embodiments, the first and second sidewalls include one or more tangs to secure the insert at least partially within the cutout portion.

In another embodiment, the floor includes one or more protrusions.

In certain embodiments, the floor includes one or more troughs to hold an adhesive used to secure the insert at least partially within the cutout portion.

In other embodiments, the flooring apparatus includes a first elongated member and a second elongated member, wherein a first end of the first elongated member includes a recess and a second end of the second elongated member includes a protrusion configured to mate with the recess when the first end of the first elongated member is in contact with the second end of the second elongated member.

In another embodiment, the insert is constructed of a polymer material.

In certain embodiments, the insert is constructed of a recycled rubber material.

In another embodiment, the elongated member is constructed of a wood material.

In yet another embodiment, the wood material is a treated pine material.

In yet another embodiment, the wood material is an engineered wood material.

In still another embodiment, a top surface of the insert is coplanar with the top surface of the elongated member.

In some embodiments, a top surface of the insert is located above the top surface of the elongated member.

In another embodiment, a top surface of the insert is located below the top surface of the elongated member.

In certain embodiments, the cutout portion includes a floor, a first side wall and a second sidewall, and the floor is located closer to the top surface than the bottom surface of the elongated member.

In other embodiments, the cutout portion includes a floor, a first side wall and a second sidewall, and the floor is located closer to the bottom surface than the top surface of the elongated member.

In another embodiment, the cutout portion includes a floor, a first side wall and a second sidewall, and the floor is located about half way between the top surface and the bottom surface of the elongated member.

In yet another embodiment, the flooring apparatus includes one or more attachment mechanisms to secure the insert to the elongated member.

In still another embodiment, the attachment mechanism is one of an adhesive and a mechanical fastener.

In some embodiments, the cutout portion includes a floor, a first sidewall and a second sidewall, and the attachment mechanisms are secured to the floor.

In another embodiment, the cutout portion includes a floor, a first sidewall and a second sidewall, and the attachment mechanisms are secured to the first and second sidewalls.

In certain embodiments, a top surface of the insert includes one or more protrusions.

In other embodiments, the elongated member and the insert are capable of being colored.

In another embodiment, the flooring apparatus includes a cap located on an end of the elongated member.

In certain embodiments, an end of the elongated member is sealed.

In other embodiments, the cutout portion covers more than about 80 percent of the area of the top surface of the elongated member.

In a second aspect, there is provided a trailer that includes at least one wheel, a frame coupled to the at least one wheel and a plurality of elongated members. In some embodiments, the frame includes a first frame member, a second frame member spaced from the first frame member, and a plurality of intermediate frame members extending between the first frame member and the second frame member. The plurality of elongated members may be supported by the intermediate frame members and the elongated members may include a top surface that includes a cutout portion and an insert positioned at least partially within the cutout portion.

In certain embodiments, the intermediate frame members are spaced between about 6 and about 24 inches from each other.

In other embodiments, the trailer includes one or more attachment mechanisms to secure the elongated members to the frame.

In another embodiment, the trailer includes one or more attachment mechanisms to secure the elongated members and the inserts to the frame.

In yet another embodiment, the elongated members are spaced from each adjacent elongated member.

In a third aspect, there is provided a method of manufacturing a flooring apparatus that includes providing an elongated member that includes a top surface and a bottom surface, creating a cutout portion in the top surface of the elongated member, and securing an insert at least partially within the cutout portion.

In certain embodiments, securing the insert at least partially within the cutout portion includes inserting an adhesive between the insert and the cutout portion.

In other embodiments, securing the insert at least partially within the cutout portion includes applying one or more mechanical attachment mechanisms to the insert and the elongated member.

In another embodiment, the method includes creating the insert by extruding or cutting a polymer material.

In yet another embodiment, the method includes creating one or more protrusions on a top surface of the insert.

In still another embodiment, the elongated member is a wood material and creating a cutout portion in the top surface of the wood material includes milling the wood material.

In some embodiments, the elongated member is made of a wood material and the method further includes treating the elongated member with a chemical.

In a fourth aspect, there is provided a method of manufacturing a trailer that includes providing at least one wheel and securing the at least one wheel to a frame that includes a first frame member, a second frame member spaced from the first frame member, and a plurality of intermediate frame members extending between the first frame member and the second frame member. The method may also include providing a plurality of elongated members that have a top surface that includes a cutout portion and an insert that is secured at least partially within the cutout portion. The method may further include securing the plurality of elongated members to at least some of the intermediate frame members.

In certain embodiments, the method includes securing at least some of the plurality of elongated members to one or more of the first and second frame members.

In other embodiments, a plurality of elongated members are secured to at least some of the intermediate frame members by applying mechanical fasteners to the elongated members and the intermediate frame members.

In another embodiment, the method includes spacing each elongated member from the adjacent elongated members.

In yet another embodiment, the method includes coupling an end cap to an end of at least one of the elongated members.

In still another embodiment, the method includes sealing an end of at least one of the elongated members.

In some embodiments, the method includes linking a first elongated member to a second elongated member such that a first end of the first elongated member contacts a second end of the second elongated member.

In another embodiment, the first end of the first elongated member includes a recess and the second end of the second elongated member includes a protrusion that is configured to fit within the recess.

In yet another aspect, a method includes providing an elongated member having a top surface, and depositing a first adhesive about a perimeter of the top surface of the elongated member. This method also includes depositing a second adhesive within the perimeter of the top surface of the elongated member, with the second adhesive having a lower viscosity than the first adhesive and being retained within the perimeter by the first adhesive. A friction-increasing member is heated to a pre-heat temperature, and then the friction-increasing member is disposed on the first and second adhesive to form a flooring apparatus. The flooring apparatus is cured at a curing temperature greater than the pre-heat temperature.

At least one cutout portion may be formed in the top surface of the elongated member and positioned within the perimeter thereof, prior to depositing the first adhesive. The friction-increasing member may have a width greater than a width of the at least one cutout portion and may be disposed on the first and second adhesive so as to cover the at least one cutout portion. The first adhesive may be deposited outside of the at least one cutout portion. The second adhesive may be deposited at least partially within the at least one cutout portion and at least partially outside the at least one cutout portion.

Forming the at least one cutout portion may include forming first and second cutout portions in the top surface of the elongated member respectively having first and second widths, and forming a third cutout portion in the top surface of the elongated member between the first and second cutout portions and having a third width, with the third width being less than the first and second widths. The first and second widths may be equal.

The friction-increasing member may have a fourth width greater than the first, second, and third widths, and may be disposed on the first and second adhesive so as to cover the first, second, and third cutout portions. In addition, the top surface of the elongated member between the first and third cutouts and between the third and second cutouts may serve to support the friction-increasing member.

The curing may be performed within a convection oven. The second adhesive may be a self-leveling adhesive. The elongated member may be formed from a naturally occurring material, and wherein the friction-increasing member may be formed from a man-made material. The man-made material may be a polymer material, and the naturally occurring material may be wood or grass.

A trailer may be assembled using the flooring apparatus as a section of flooring for the trailer.

Another aspect is directed to a flooring apparatus made using the method just described. This flooring apparatus may include an elongated member having a top surface, a first adhesive positioned about a perimeter of the top surface, a second adhesive positioned within the perimeter of the top surface, and a friction-increasing member contacting the first and second adhesives, with the first and second adhesives coupling the friction-increasing member to the elongated member. The first adhesive may have a higher viscosity than the second adhesive. The first adhesive may retain at least a portion of the second adhesive within the perimeter. The second adhesive may be a self-leveling adhesive. In addition, the friction-increasing member may be a polymer material.

A further aspect is directed to a trailer having a floor constructed from the flooring apparatus just described. The trailer may include at least one wheel, and a frame mechanically linked to the at least one wheel. The frame may include a first frame member, a second frame member spaced from the first frame member, and a plurality of intermediate frame members extending at least partway between the first frame member and the second frame member. A plurality of elongated members may be supported by one or more of the intermediate frame members, with the elongated members include a top surface and a bottom surface, with the top surface having a first adhesive positioned at a perimeter of the top surface and a second adhesive positioned within the perimeter of the top surface. The elongated members may each be a friction-increasing member secured to the top surface by the first and second adhesives.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE FIGURES

The accompanying drawings facilitate an understanding of the various embodiments.

DETAILED DESCRIPTION

Figure 1:
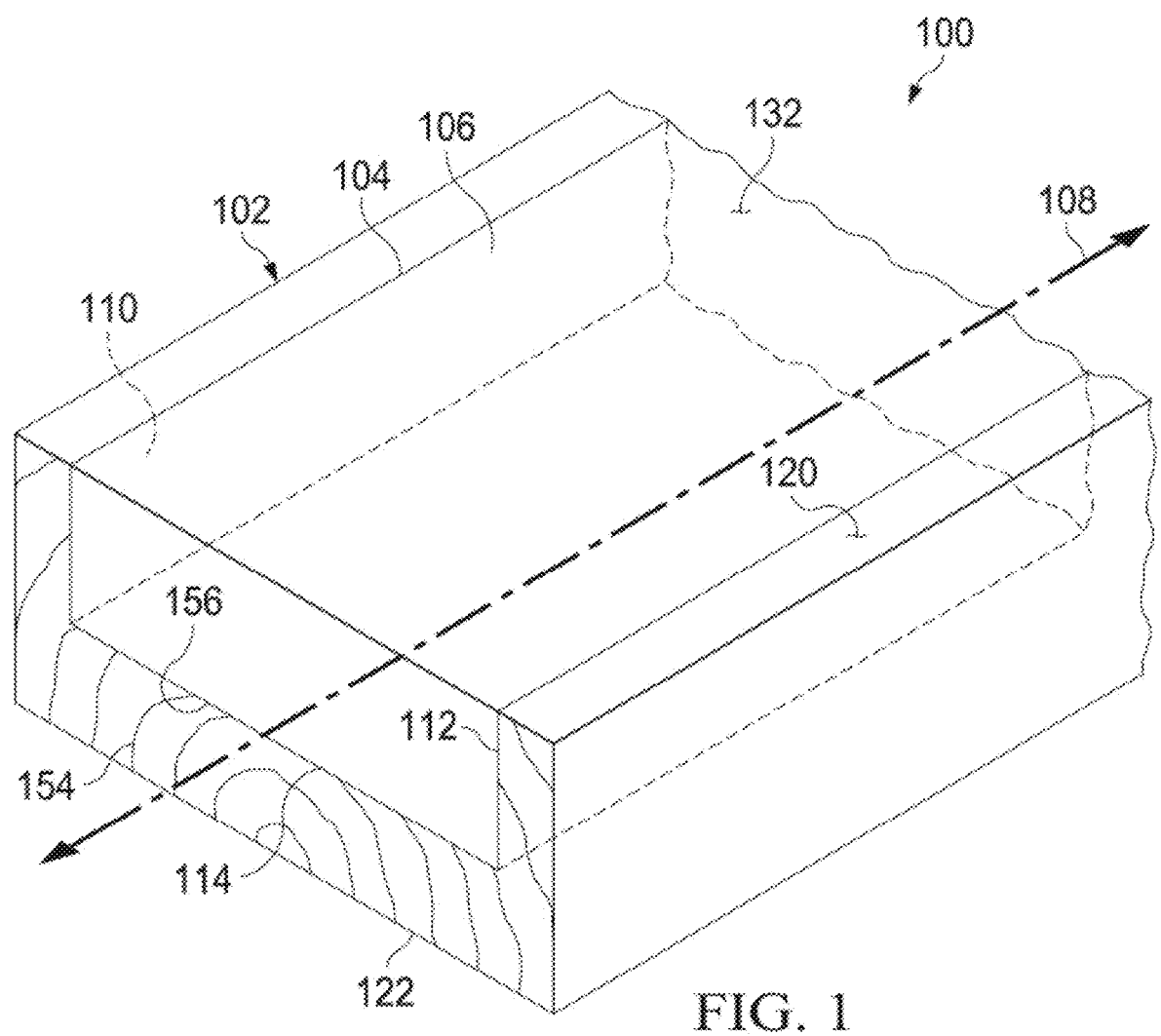
FIG. 1 is a perspective view of an exemplary embodiment of a flooring apparatus.

FIG. 1 is a perspective view of an exemplary embodiment of a flooring apparatus 100 that includes an elongated member 102 with a cutout portion 104 and an insert 106 that is located at least partially within the cutout portion 104. As will be described in further detail below, the apparatus 100 may provide improved traction, improved wear resistance, improved structural support and other benefits to a floor. The flooring apparatus may be used as the floor of a cargo trailer, the floor of the deck of a house, the steps of a ladder or staircase or any other application requiring a surface.

In some embodiments, the elongated member 102 is a rectangular shape and may be, for example, approximately 8 inches by 2 inches by several feet or more. In other embodiments, the elongated member 102 may be larger or smaller than 8 inches by 2 inches. The elongated member 102 may be constructed of any suitable material, for example, wood, metal and/or plastic, or any suitable combination of materials. In some embodiments, for example, the elongated member 102 is made of a treated wood material, such as a treated pine. In some embodiments, the elongated member 102 is made of Treated Southern Yellow Pine. The elongated member 102 may be made of other wood materials in other embodiments. In some embodiments, for example, the elongated member 102 is made of Douglas Fir, Hem Fir or SPF (spruce-pine-fir). In yet other embodiments, the elongated member 102 is made of Canadian SPF. In some embodiments, the elongated member 102 is made of an engineered wood material such as, for example, Structural Composite Lumber (SCL), Laminated Veneer Lumber (LVL), Parallel Strand Lumber (PSL), Oriented Strand Lumber (OSL), or Laminated Strand Lumber (LSL).

In some embodiments, the elongated member 102 may be constructed of a wood material that is specifically chosen for its non-warping characteristics so that it is less prone to warp over time. In some embodiments, for example, the elongated member 102 is chosen such that the growth rings 154 are curved away from the cutout portion 104, as shown in the embodiment illustrated in FIG. 1. In some embodiments, the orientation of the growth rings away from the cutout portion 104 counteracts possible upward curling of the elongated member 102 due to the cutout portion 104.

In some embodiments, the color of the elongated member 102 can be changed, for example, by staining or painting the elongated member 102. In some embodiments, the elongated member 102 and the insert 106 are both made of materials whose color can be changed so that the color of the elongated member 102 can be matched to the color of the insert 106. In other embodiments, the color of the elongated member 102 and the color of the insert 106 do not match. In some embodiments, a colored pigment, such as an ETDM pigment, is added to the material from which the insert 106 is made to give the insert 106 a particular color. For example, in some embodiments a pigment is added to the base polymer from which the insert 106 is made. The insert 106 can be any suitable color based on the pigment, paint or other material that is added to the insert 106 during its formation.

In some embodiments, the elongated member 102 includes a cutout portion 104 that extends along at least a portion of a longitudinal axis 108 of the elongated member 102. As will be described in more detail below, the cutout portion 104 may be any suitable shape and in some embodiments includes a first sidewall 110, a second sidewall 112 and a floor 114.

In some embodiments, the cutout portion 104 is sized and shaped to hold at least a portion of the insert 106. The insert 106 may be any suitable size and shape that can be at least partially located in the cutout portion 104. For example, in some embodiments the insert 106 is rectangular in shape. In some embodiments, a top surface 132 of the insert 106 may be substantially flat or may be curved, for example, in a protruding, convex shape. The surfaces of the insert 106 may contact the sidewalls 110 and 112 and floor 114 of the cutout portion or may not contact one or more of the sidewalls 110 and 112 and/or the floor 114. In some embodiments, for example, the insert 106 has a curved bottom surface 156 and only a portion of the bottom surface 156 contacts the floor 114 or the sidewalls 110 and 112.

In some embodiments, the insert 106 is slightly smaller than the cutout portion 104 to allow for variations in the rate at which the insert 106 and the elongated member 104 expand and contract over time. For example, in some embodiments the elongated member 104 and the insert 106 may expand and contract at different rates as a result of variations in ambient temperature. In some embodiments, the insert 106 is held in a centered orientation in the cutout portion 104 by one or more coupling devices (see e.g., the coupling device 130 of FIG. 5A). In some embodiments, the coupling devices 130 maintain the insert 106 in a central location in the cutout portion 104 while allowing the insert 106 to expand/contract within the cutout portion 104.

The surfaces of the insert 106 may also include a texture, such as, for example, a series of protrusions and recesses (not shown in FIG. 1), to increase the traction of the surfaces of the insert 106. In some embodiments, the surfaces of the cutout portion 104 may also include a surface texture.

Figure 2:
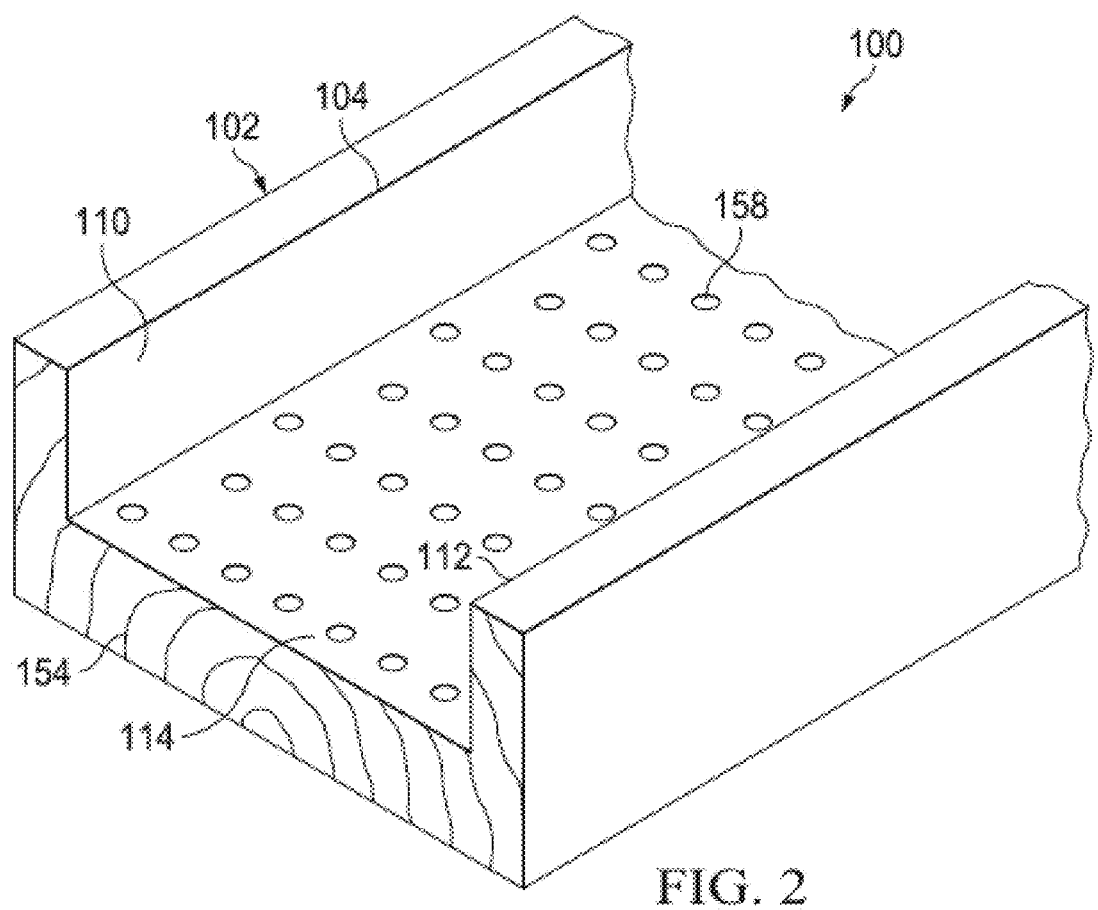
FIG. 2 is a perspective view of an embodiment of an elongated member including holes in a surface of the cutout portion.

Referring now to FIG. 2, in some embodiments the cutout portion 104 includes holes 158 in the floor 114 to provide additional surface area to which an adhesive is coupleable to secure the insert 106 (FIG. 1) to the cutout portion 104. For example, in some embodiments an adhesive (see e.g., the adhesive 126 shown in FIG. 4) is used to couple the insert 106 (FIG. 1) to the cutout portion 104 and the adhesive 126 provides the strongest coupling strength at the location of the holes 158 due to the increased depth of the adhesive 126 contained within the holes 158. In some embodiments, the first and second sidewalls 110 and 112 of the cutout portion 104 also include holes 158. In some embodiments, the insert 106 also includes holes (not shown) to allow for the adhesive 126 to enter the holes and further secure the insert 106 to the cutout portion 104.

Referring again to FIG. 1, the insert 106 may be made of any suitable material. In some embodiments, the insert 106 may be made of a polymer material that has a high frictional coefficient, such as a rubber material. In some embodiments, the insert 106 may be made of a recycled rubber material, such as a material made from recycled tire material. In some embodiments, the insert 106 may include colored pigments and in other embodiments may be made of one or more of a rebonded rubber material, a vulcanized rubber material and/or an extruded rubber material, such as, for example, RUMBER® flooring material manufactured by Rumber Materials, located in Muenster, Tex.

Figure 3A:
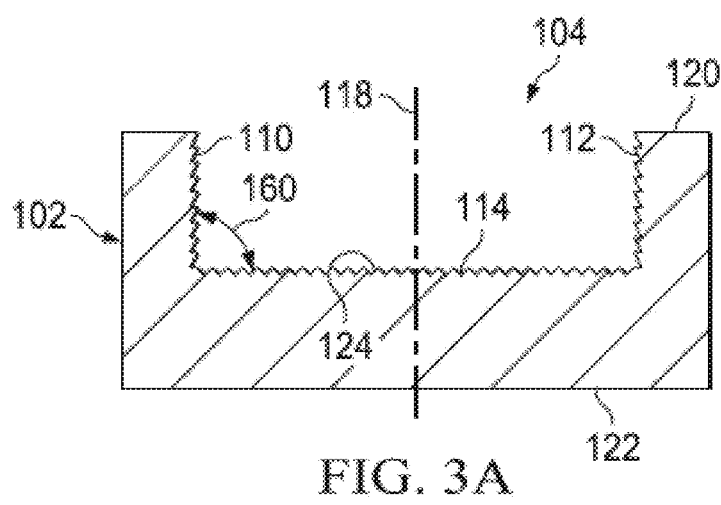
FIGS. 3A, 3B, 3C and 3D are cross-section, side views of exemplary embodiments of an elongated member of a flooring apparatus.
Figure 3B:
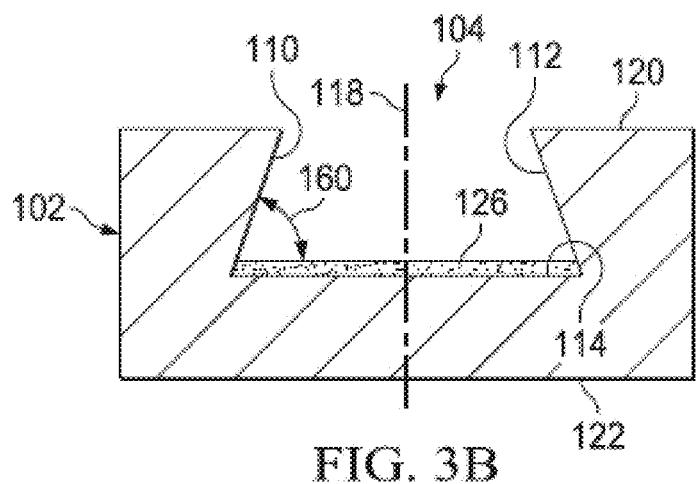
Figure 3C:
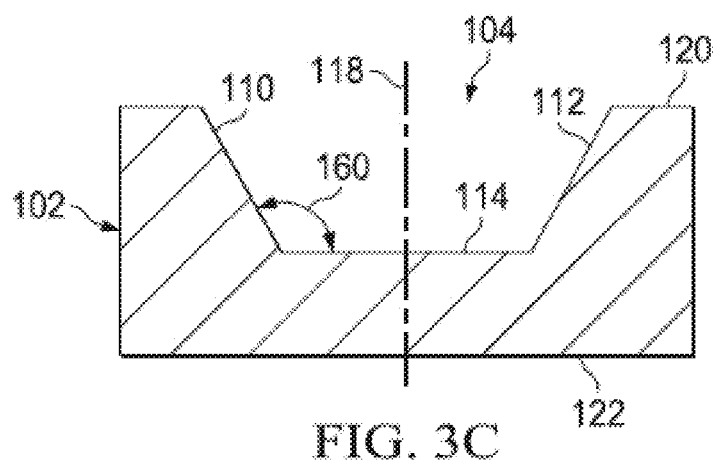
Figure 3D:
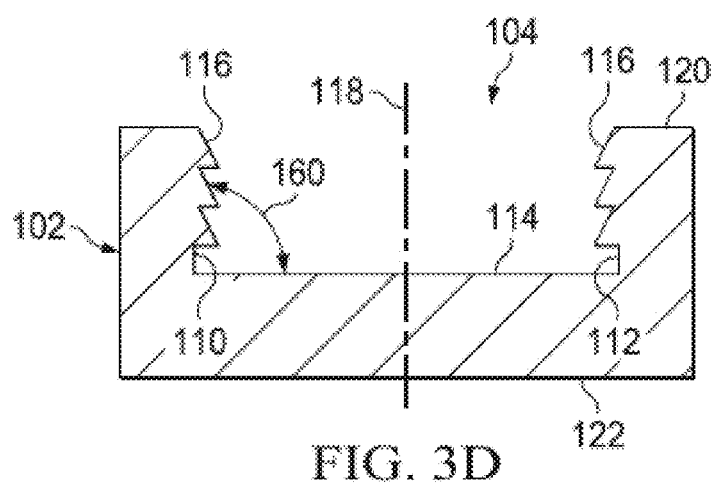

FIGS. 3A-3D show cross-sectional, side views of exemplary embodiments of the elongated member 102 and the cutout portion 104. In the embodiment of FIG. 3A, for example, the cutout portion 104 is rectangular and includes a first sidewall 110 and a second sidewall 112 that extends from a floor 114 at an angle 160 that is about 90 degrees. In the embodiment of FIG. 3B, the first sidewall 110 and the second sidewall 112 extend at an angle 160 that is less than about 90 degrees from the floor 114. In the embodiment of FIG. 3C, the first sidewall 110 and the second sidewall 112 extend at an angle 160 that is more than about 90 degrees from the floor 114. In the embodiment of FIG. 3D, the first sidewall 110 and the second sidewall 112 extend at an angle 160 of about a 90 degrees from the floor 114 and include a plurality of tangs 116, as will be described in more detail below.

The cutout portion 104 may be symmetric about a centerline 118 of the elongated member 102, as shown in FIGS. 3A-3D, or may be asymmetric about the centerline 118 (not shown). The cutout portion 104 may have a constant cross-sectional shape along the longitudinal axis 108 of the cutout portion 104 or may have various cross-sectional shapes along the longitudinal axis 108 of the cutout portion 104.

The cutout portion 104 may also be any suitable size with respect to the elongated member 102. In some embodiments, for example, the cutout portion 104 occupies about 80 percent of the top surface 120 of the elongated member 102. As such, when the insert 106 is placed within the cutout portion 104, the insert 106 may also cover up to about 80 percent of the top surface 120 of the elongated member 102. In some embodiments, the cutout portion 104 occupies more than about 80 percent of the top surface 120 of the elongated member 102 (or more than about 80 percent of the width of the top surface 120) and, when the insert 106 is placed within the cutout portion 104, the insert 106 may also cover more than about 80 percent of the width or entirety of the top surface 120 of the elongated member 102. In other embodiments, the cutout portion 104 occupies less than about 80 percent of the top surface 120 (or less than about 80 percent of the width of the top surface 120) of the elongated member 102 and, when the insert 106 is placed within the cutout portion 104, the insert 106 may also occupy less than about 80 percent of the width or the entirety of the top surface 120 of the elongated member 102.

The cutout portion 104 may also have any suitable surface texturing to help secure the insert 106 within the cutout portion 104. For example, referring again to the embodiment of FIG. 3A, the first and second sidewalls 110 and 112 or the floor 114 may include a plurality of protrusions 124 or surface texture to help secure the insert 106 at least partially within the cutout portion 104. In the embodiment of FIG. 3B, the angle 160 at which the first and second sidewalls 110 and 112 extend with respect to the floor 114 may help secure the insert 106 at least partially within the cutout portion 104. In the embodiment of FIG. 2D, the first and second sidewalls 110 and 112 may include a plurality of tangs 116 or other protrusions to help secure the insert 106 at least partially within the cutout portion 104.

Other surface texturing or modifications to the cutout portion 104 and/or the insert 106 may be used to further secure the insert 106 at least partially within the cutout portion 104. For example, in some embodiments, the insert 106 may include protrusions (not shown) that mate with corresponding recesses (not shown) in the cutout portion 104 so that the insert 106 may be "snapped" into place in the cutout portion 104.

In some embodiments, additional mechanisms may be coupled to the elongated member 102 and the insert 106 to further secure the insert 106 at least partially within the cutout portion 104. For example, in the embodiment of FIG. 4 an adhesive 126 is located in the cutout portion 104 to secure the insert 106 (not shown) to the floor 114 of the cutout portion 104. The adhesive 126 may be any suitable adhesive. For example, in some embodiments the adhesive is CHEMREX® CX-948 or CX-941, both made by BASF, located in Shakopee, Minn., USA. In some embodiments, the adhesive is one or more of HYBOND® 80 PLUS, made by Hybond located at Longden, Shrewsbury, United Kingdom; LOCTITE® PL® 500 Landscape Block Adhesive, made by Loctite located at Westlake, Ohio; FORTANE LD® Wood Flooring Urethane Adhesive, made by Fortane located at Indianapolis, Ind.; and HENRY® 440 Cove Base Adhesive, made by The W.W. Henry Company located at Aliquippa, Pa.

Figure 4:
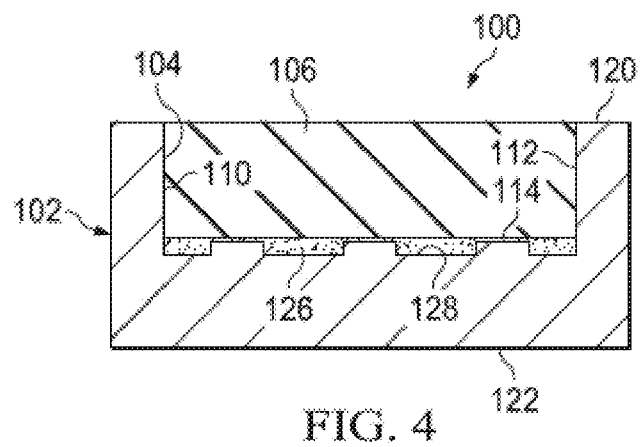
FIG. 4 is a cross-section, side view of an exemplary embodiment of a flooring apparatus that includes a plurality of troughs on a floor of a cutout portion.

Referring still to FIG. 4, in some embodiments the elongated member 102 includes a plurality of troughs 128 in the floor 114 of the cutout portion 104 to hold an adhesive 126. In some embodiments, the troughs 128 may allow for expansion and contraction of the adhesive 126 according to weather conditions or other factors. In some embodiments, the troughs 128 allow for a greater depth or thickness of adhesive to reside between the insert 106 and the floor 114 of the cutout portion 104 which may increase the strength of the bond between the insert 106 and the floor 114. In addition, the cutout portion 104 may include other features, such as holes 158 of FIG. 2, to increase the effectiveness of the adhesive 126 between the insert 106 and the floor 114.

Figure 5A:
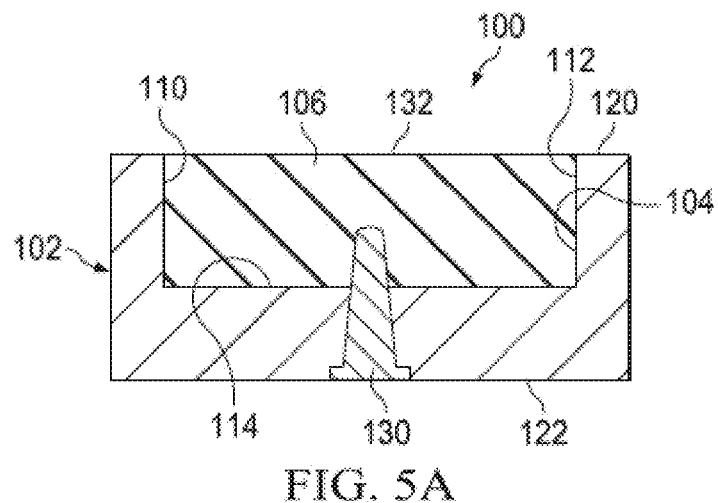
FIG. 5A is a cross-section, side view of an exemplary flooring apparatus that includes an attachment mechanism in a floor of the elongated member.

FIG. 5A is a cross-sectional, side view of an exemplary flooring apparatus 100 that includes an attachment mechanism 130 extending from the bottom surface 122 of the elongated member 102 through the floor 114 of the elongated member 102 to further secure the insert 106 at least partially within the cutout portion 104. The attachment mechanism 130 may be any suitable attachment mechanism, such as, for example, a nail or a screw. While the attachment mechanism 130 in FIG. 5A extends from the bottom surface 122 of the elongated member 102 upward to the insert 106, the attachment mechanism 130 may be located in any suitable position. For example, in some embodiments, the attachment mechanism 130 extends from a top surface 132 of the insert 106 downward through the floor 114 of the elongated member 102. The apparatus 100 may include a plurality of attachment mechanisms 130 spaced periodically throughout the insert 106. As described above, the attachment mechanisms 130 may keep the insert 106 at least partially within the cutout portion 104 in the case of expansion or contractions of one or more of the insert 106 or the elongated member 102.

Figure 5B:
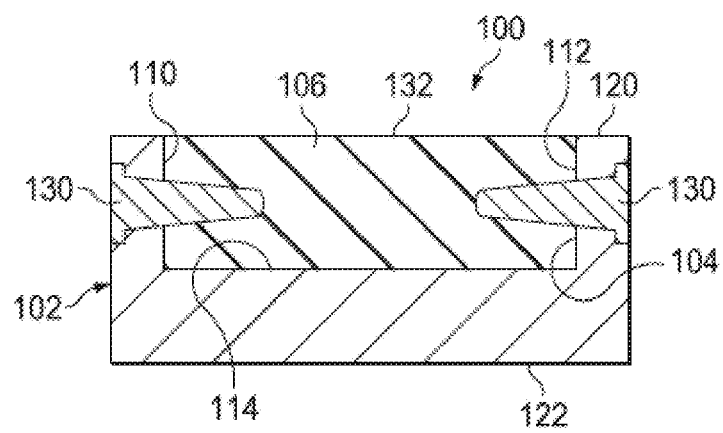
FIG. 5B is a cross-section, side view of an exemplary flooring apparatus that includes attachment mechanisms in first and second sidewalls of the elongated member.

The first and second sidewalls 110 and 112 may also be coupled to the insert 106 by attachment mechanisms 130. For example, FIG. 5B is a cross-sectional, side view of an exemplary flooring apparatus 100 that includes attachment mechanisms 130 in the first and second sidewalls 110 and 112 of the elongated member 102.

Figure 6:
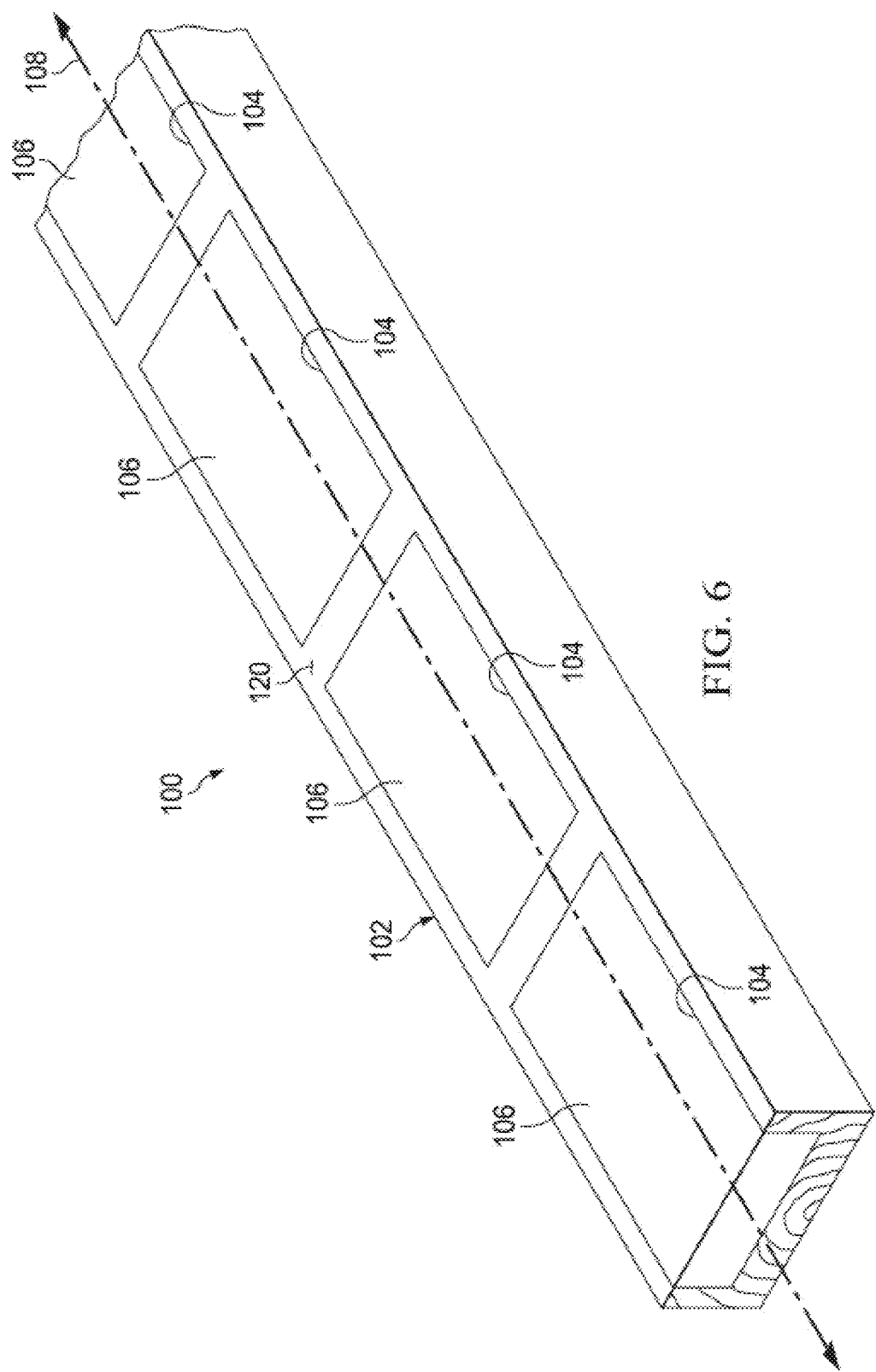
FIG. 6 is a perspective view of an exemplary embodiment of a flooring apparatus that includes a plurality of cutout portions.

FIG. 6 is a perspective view of a flooring apparatus 100 with an elongated member 102 that includes a plurality of cutout portions 104 extending along the longitudinal axis 108 of the elongated member 102. As shown in FIG. 6, the cutout portions 104 may be spaced from each other along the longitudinal axis 108. Each of the cutout portions 104 may include an insert 106 and, in some embodiments, each of the cutout portions 104 may include a plurality of inserts 106. The inserts 106 may be secured within the cutout portions 104 by an adhesive, one or more attachment mechanisms 130, or some other securing method or combination of methods or mechanisms.

Figure 7A:
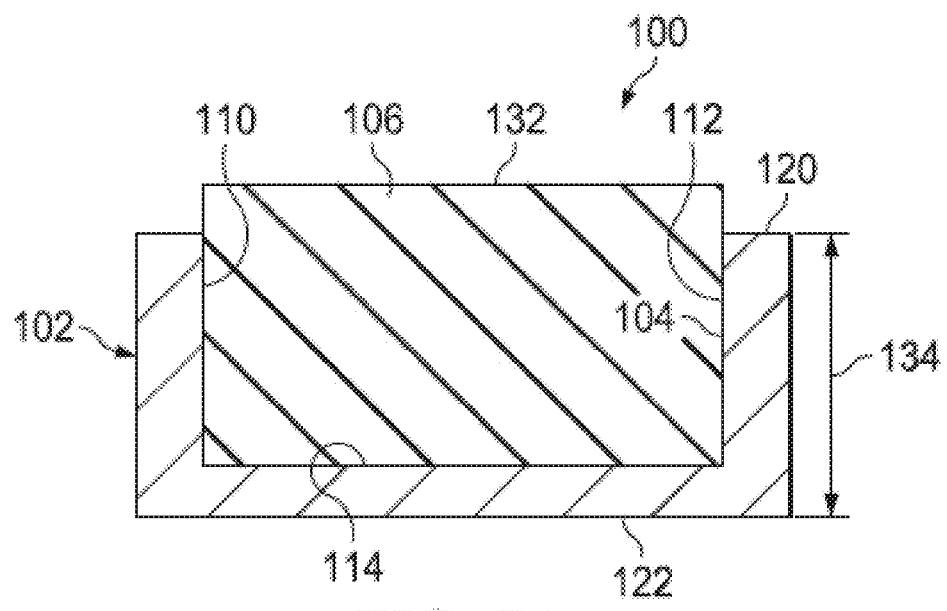
FIG. 7A is a cross-section, side view of an exemplary flooring apparatus in which a top surface of the insert is located above a top surface of the elongated member.
Figure 7B:
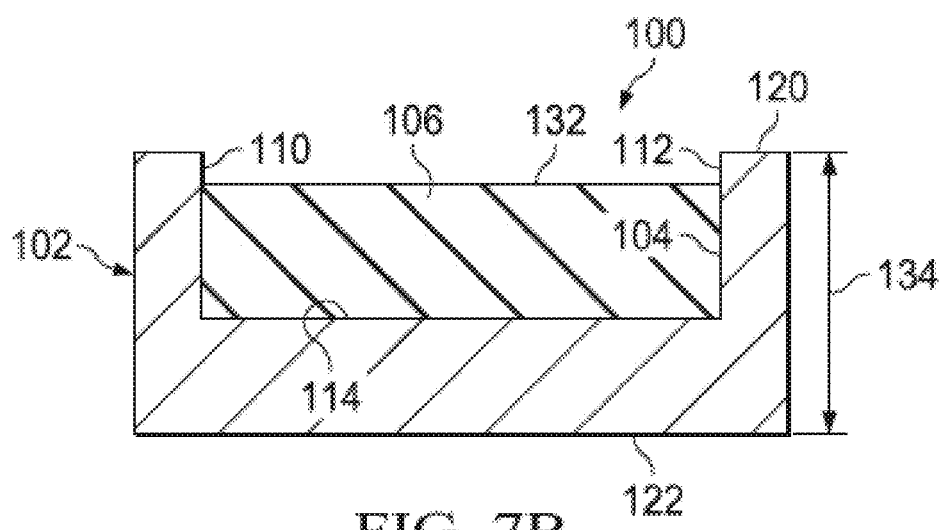
FIG. 7B is a cross-sectional, side view of an exemplary flooring apparatus in which a top surface of the insert is located below a top surface of the elongated member.

Referring now to FIG. 7A, in some embodiments the insert 106 may be partially or fully located within the cutout portion 104. In some embodiments, a top surface 132 of the insert 106 is located above the top surface 120 of the elongated member 102, as shown in FIG. 7A. In other embodiments, the top surface 132 of the insert 106 is located below the top surface 120 of the elongated member 102, as shown in FIG. 7B. In some embodiments, the top surface 132 of the insert 106 is coplanar with the top surface 120 of the elongated member 102, as shown in FIG. 1. Although the top surface 132 of the insert 106 is shown in FIGS. 7A and 7B as a flat surface, the top surface 132 may have any suitable shape and may be, for example, semi-circular in shape so that portions of the top surface 132 are below the top surface 120 and portions of the top surface 132 are above the top surface 120.

The insert 106 and the cutout portion 104 may also extend to any suitable depth in the elongated member 102. For example, in the embodiment shown in FIG. 6A the floor 114 of the cutout portion 104 is located closer to the bottom surface 122 of the elongated member 102 than the top surface 120 of the elongated member 102 and the insert 106 is tall enough to contact the floor 114 and to protrude above the top surface 120 of the elongated member 102. In the embodiment of FIG. 6B, the floor 114 is located closer to the top surface 120 of the elongated member 102 than the bottom surface 122 of the elongated member 102 and the insert 106 does not protrude from the top surface 120 of the elongated member 102 when the insert 106 is in contact with the floor 114. In other embodiments, the floor 114 may be located about half way between the top surface 120 and the bottom surface 122 of the elongated member 102. In some embodiments, the floor 114 may be located about ⅜ inch from the top surface 120. In some embodiments, the floor 114 may be located about ½ inch from the top surface 120. In addition, while the insert 106 is shown to contact the floor 114 of the cutout portion 104 in the embodiments of FIGS. 7A and 7B, in some embodiments the insert 106 does not contact the floor 114 and/or one or more of the sidewalls 110 or 112. In other embodiments, the insert 106 may contact only portions of the floor 114 and/or the sidewalls 110 and 112.

Figure 8:
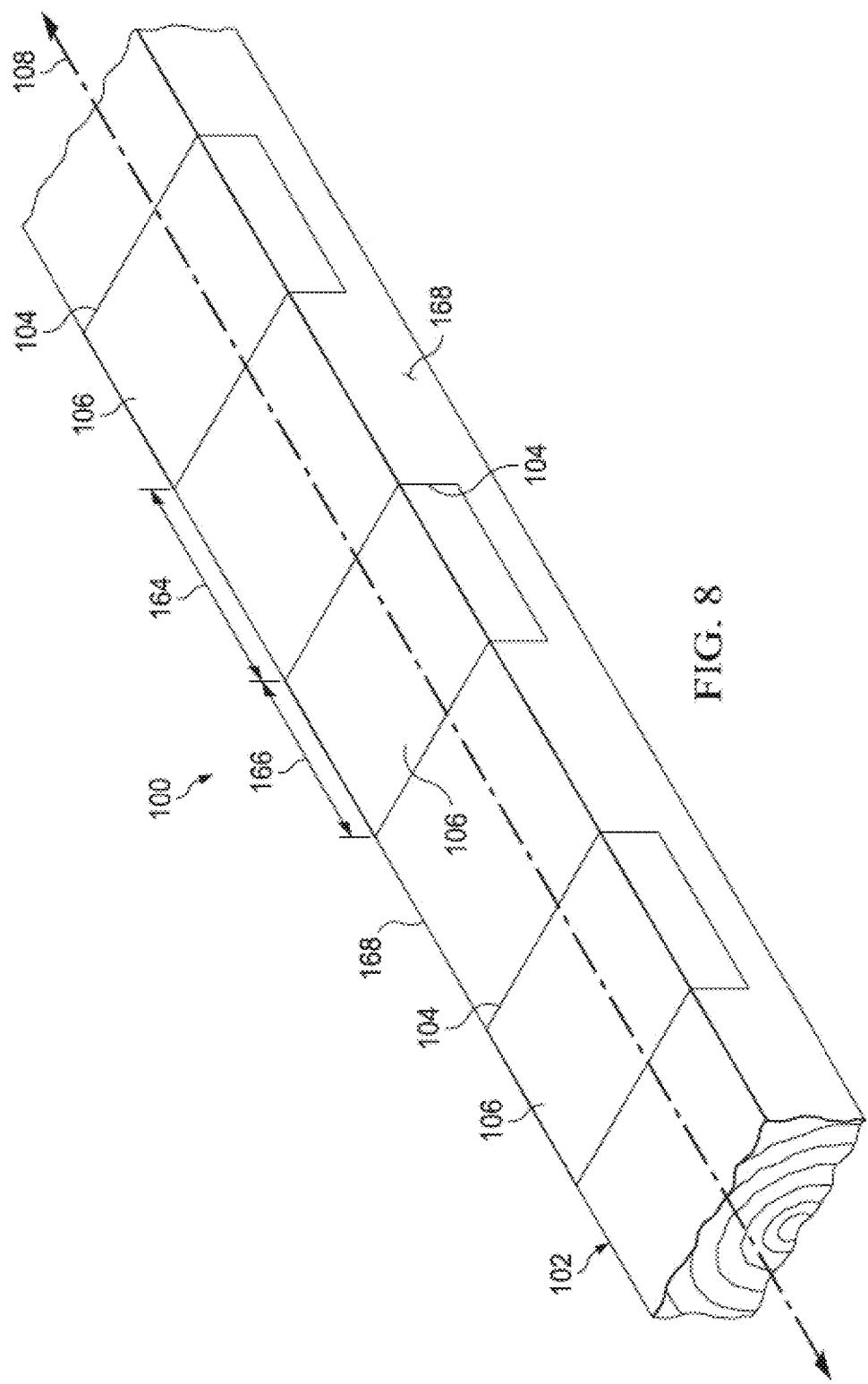
FIG. 8 is a perspective view of another embodiment of a flooring apparatus including a plurality of inserts oriented perpendicularly to a longitudinal axis of the elongated member.

Referring now to FIG. 8, in some embodiments the cutout portions 104 are oriented perpendicularly to the longitudinal axis 108 of the elongated member 102 or, in other embodiments not specifically shown, at an angle offset from the longitudinal axis 108 of the elongated member 102. In some embodiments, the elongated member 102 includes a plurality of perpendicularly-situated cutout portions 104 that each include at least one insert 106. In some embodiment, a distance 164 between cutout portions 104 is about twice the width 166 of the cutout portions 104.

In some embodiments, the cutout portions 104 extend through the sidewalls 168 of the elongated member 102, as shown in FIG. 8. In other embodiments, the cutout portions 104 do not extend through the sidewalls 168 of the elongated member 102.

Figure 9:
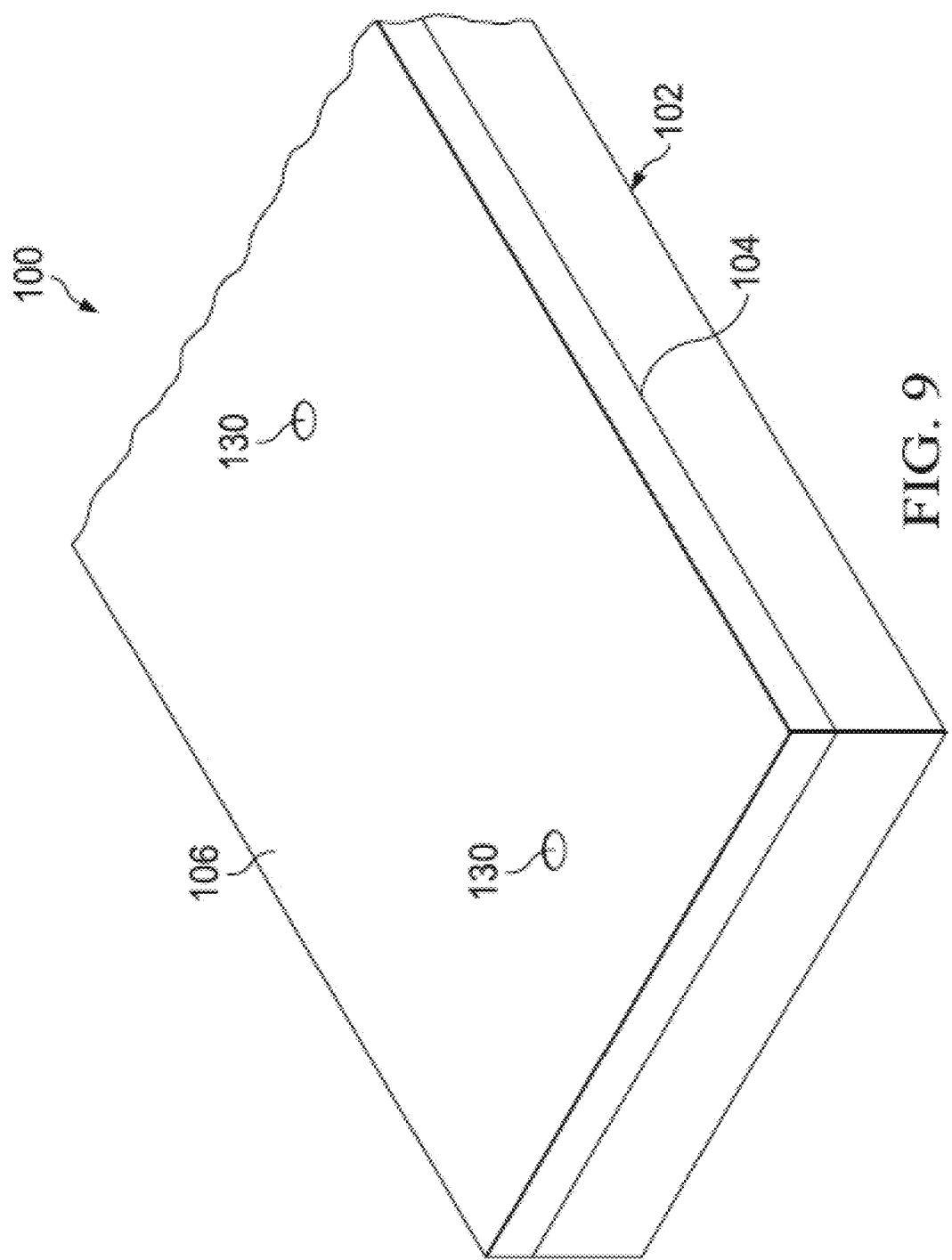
FIG. 9 is a perspective view of another embodiment of a flooring apparatus including an insert covering an entire top surface of the elongated member.

Referring now to FIG. 9, in some embodiments the cutout portion 104 extends across the entire top surface of the elongated member 102. In some embodiments, the insert 106 is coupled to the cutout portion 104 and is co-extensive with the elongated member 102, as shown in FIG. 9. The insert 106 may be secured to the elongated member 102 by one or more fastening mechanisms 130, an adhesive 126 (not shown), or a combination of fastening mechanisms 130 and adhesives 126.

In other embodiments, the elongated member 102 does not include a cutout portion 104 and the insert 106 is coupled directly to the top of the elongated member 102. This embodiment looks similar to the embodiment depicted in FIG. 9 except that the elongated member 102 will be thicker because it has not been cut to form a cutout portion 104. The insert 106 may be secured to the elongated member 102 by one or more fastening mechanisms 130, an adhesive 126, or a combination of fastening mechanisms 130 and adhesives 126

Figure 10A:
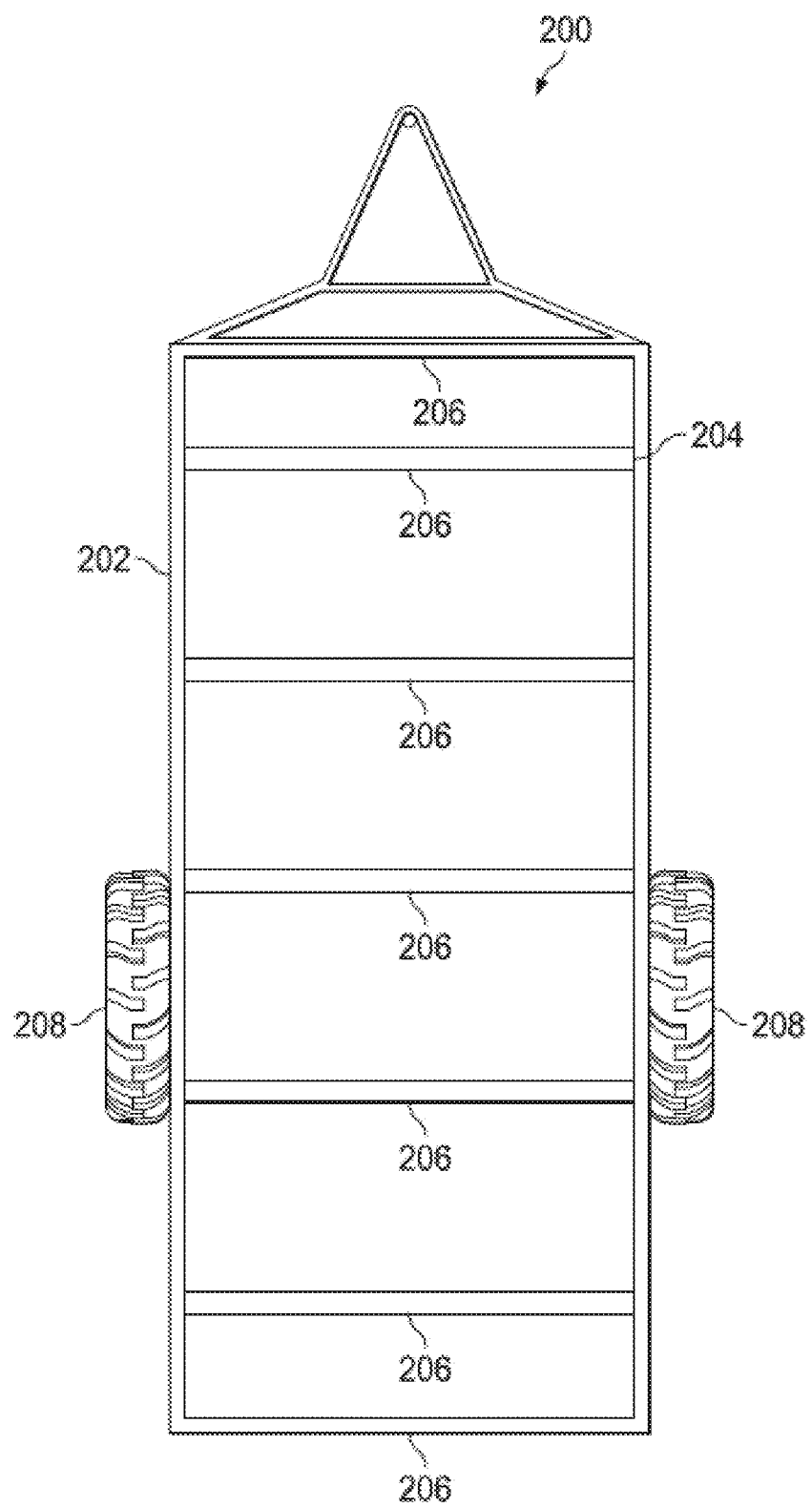
FIG. 10A is a top view of an exemplary trailer that includes a first frame member, a second frame member and a plurality of intermediate frame members.

FIG. 10A is a top view of an exemplary trailer 200. The trailer 200 generally includes a first frame member 202, a second frame member 204, a plurality of intermediate frame members 206 and two wheels 208 that are rotatably secured to or adjacent to the frame members 202, 204 and/or 206. The first frame member 202 is spaced from the second frame member 204 according to the desired width of the trailer 200. The intermediate frame members 206 extend between and are coupled to the first frame member 202 and the second frame member 204. Other frame members may be included in the trailer 200 in other embodiments. In addition, other trailers 200 may include other frame configurations. The trailer 200 is given only by way of example and is not intended to be limiting to this disclosure.

In some embodiments, the intermediate frame members 206 are spaced apart from each other by a distance of about 12 inches. In other embodiments, the distance between the intermediate frame members 206 is more or less than 12 inches. For example, in some heavy-duty trailers 200 the intermediate frame members 206 are spaced apart from each other by a distance of about 6 inches. In some embodiments, the spacing of the intermediate frame members 206 is determined by the weight requirements of the trailer 200 and the structural strength of the material used to create the trailer floor, as will be described in more detail below.

Figure 10B:
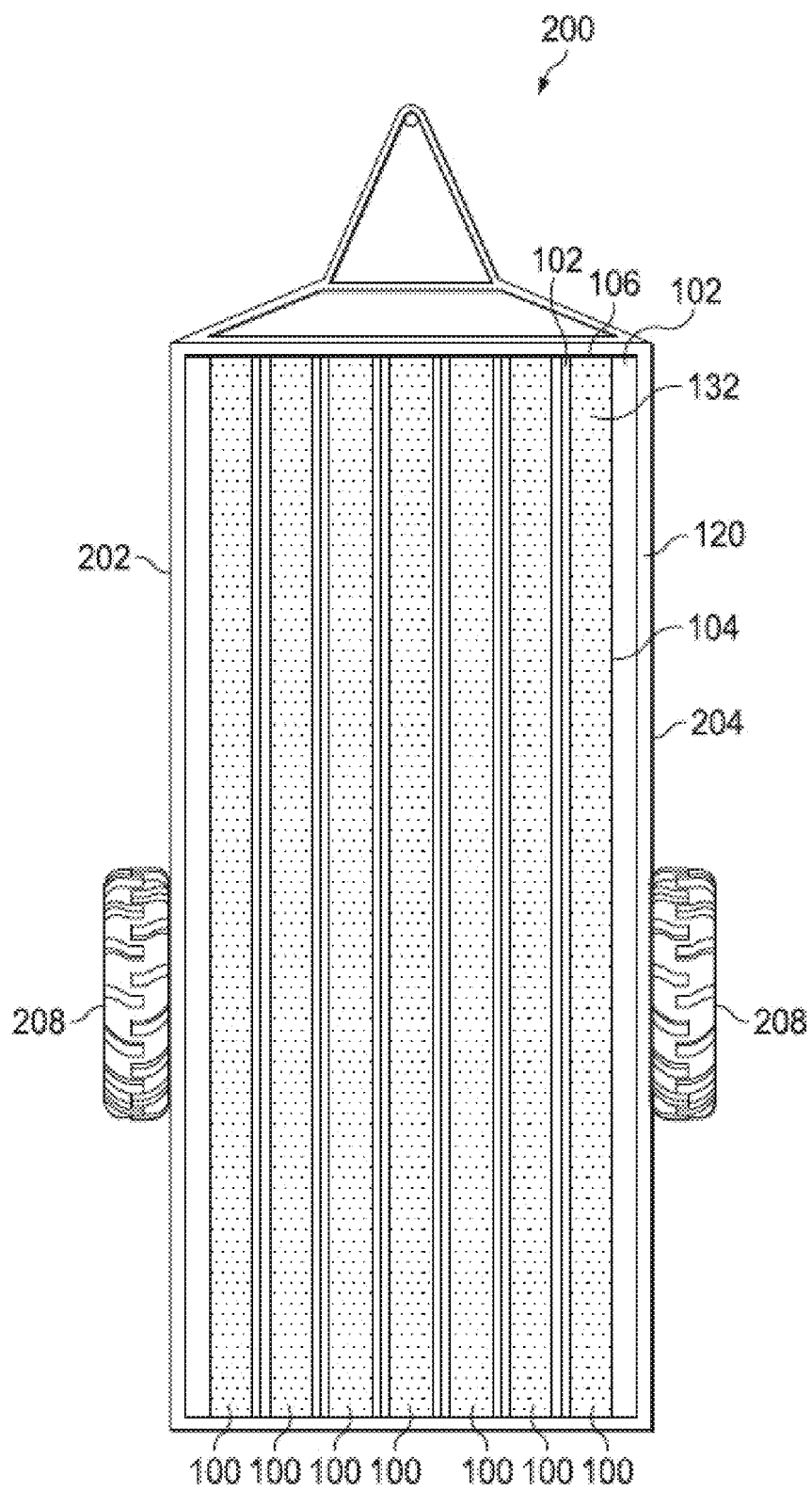
FIG. 10B is a top view of an exemplary trailer that includes a plurality of flooring apparatuses supported by the intermediate frame members.

While the intermediate frame members 206 are perpendicular to the first and second frame members 202 and 204 in the embodiment illustrated in FIGS. 10A and 10B, the intermediate frame members 206 may be positioned at any suitable orientation to the first and second frame members 202 and 204. In addition, while the first and second frame members 202 and 204 are parallel to each other, the first and second frame members 202 and 204 may be orientated at any suitable angle and, in some embodiments, may contact each other. Those of skill in the art will recognize that other trailer frame orientations are within the scope of this disclosure.

FIG. 10B is a top view of an exemplary trailer 200 that includes a plurality of flooring apparatuses 100 that extend generally from one end to the other end of the trailer 200 to form the floor of the trailer 200 and are supported by intermediate frame members 206. In other embodiments, the flooring apparatuses 100 do not extend the entirety of the length of the trailer 200, and/or the width of the trailer 200. While seven flooring apparatuses 100 are shown in the embodiment of FIG. 10B, the floor of the trailer may be formed by any number of flooring apparatuses 100. In addition, while the flooring apparatuses 100 are oriented, in this embodiment, perpendicularly to the intermediate frame members 206, the flooring apparatuses 100 may be oriented in any suitable angle to the intermediate frame members 206, not expressly shown in FIG. 10B.

As described above, the flooring apparatuses 100 may be configured to support cargo that is placed on a trailer 200. The flooring apparatus 100 may, in some instances, provide improved traction, improved wear resistance and improved structural support for the trailer floor. In some embodiments, for example, the cutout portion 104 covers a high percentage of the top surface 120 of the elongated member 102 (for example, about 80 percent of the top surface 120). As such as, the insert 106 may also cover a high percentage of the top surface 120 of the trailer floor. As a result, cargo that is placed on the trailer floor contacts mostly the top surface 132 of the inserts 106, which has increased traction and increased wear resistance.

The top surface 120 of the inserts 106 may also have a high coefficient of friction. Thus, in some embodiments the apparatuses 100 that form the trailer floor provide increased traction for objects placed on the trailer 200. For example, in some embodiments, a user may drive a backhoe or other piece of construction equipment onto the trailer floor when the trailer floor is inclined, such as on a dovetail trailer or a kneeling trailer. The increased traction of the top surface 132 of the inserts 106 provides increased traction to prevent the tires of the backhoe from slipping while driving up an inclined surface of the trailer 200. The increased traction of the top surface 120 of the inserts 106 may also assist in wet conditions, including when the apparatuses 100 are used as the flooring of an outdoor scaffolding.

In addition, in some embodiments the increased wear resistance of the top surface 132 of the inserts 106 may guard against wear and deterioration if the trailer 200 is left outside for long periods of time. As such, the trailer 200 may remain intact and/or aesthetically pleasing for a longer period of time when compared to trailers made with other flooring materials.

As described above, in some embodiments at least a portion of the top surface 120 (FIG. 1) of the elongated member 102 is exposed on the trailer floor adjacent to the insert 106. Thus, a portion of the weight of an object that is placed on the trailer 200 is supported by the elongated member 102 rather than being supported directly by the insert 106. In some embodiments, the elongated member 102 has a higher structural strength than the insert 106 and, thus, the flooring apparatus 100 may be able to support heavier objects than would be possible if the entire elongated member 102 were made of a rubber or other wear resistant material.

In addition, in those embodiments in which the cutout portion 104 does not cover the entire top surface 120 of the elongated member 102, an object on the trailer 200 contacts both the insert 106 and the top surface 120 of the elongated member 102 simultaneously. Thus, forces applied to the apparatus 100 by the object on the trailer are applied simultaneously to the insert 106 and the top surface 102 of the elongated member 102. In some embodiments, this reduces the chance that the insert 106 may be torn from the cutout portion 104.

In some embodiments, the apparatuses 100 are sufficiently strong that the trailer 200 requires fewer intermediate frame members 206 to support a particular object on the trailer 200. Thus, in some embodiments the cost to build the trailer 200 and the overall weight of the trailer 200 can be reduced when using the apparatus 100.

Figure 11:
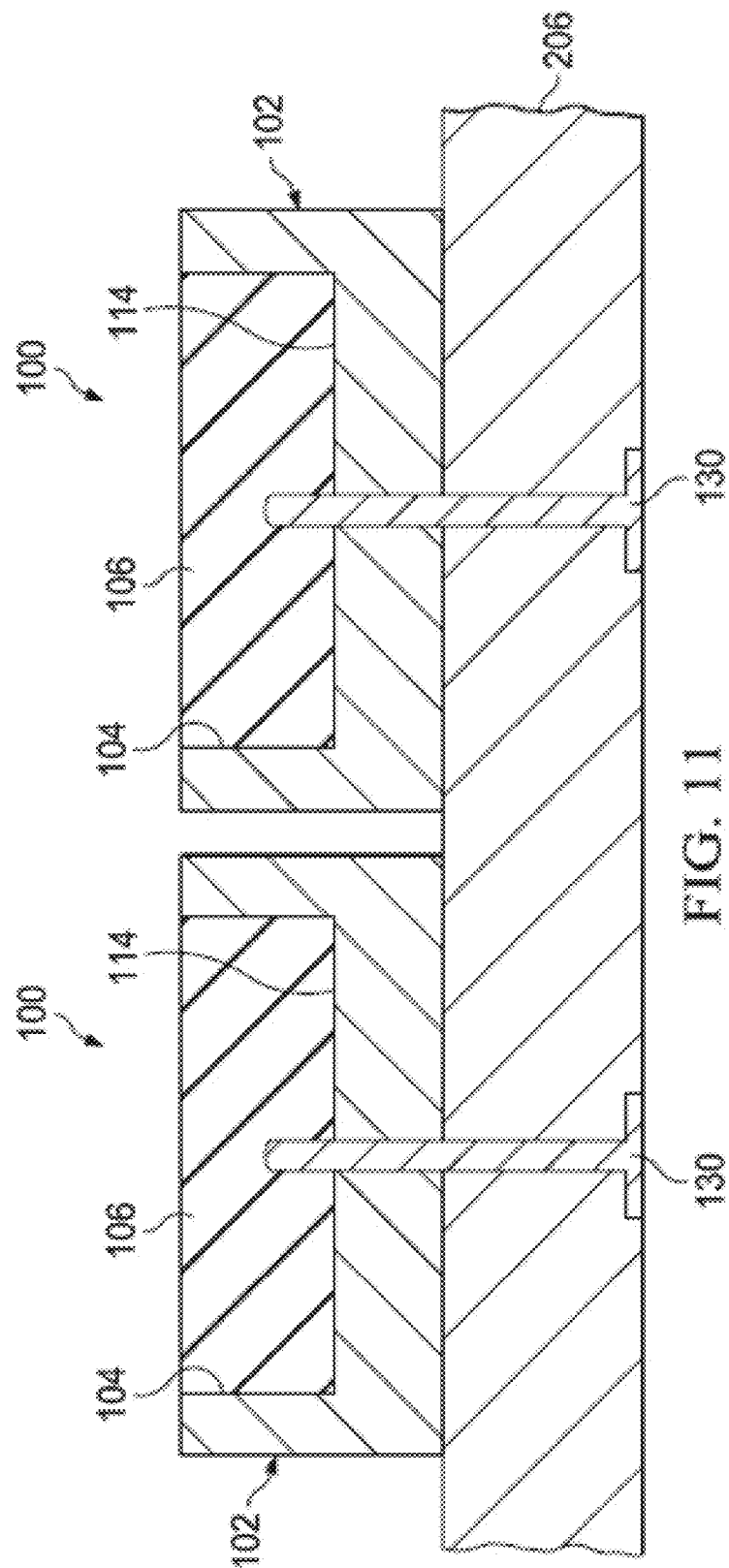
FIG. 11 is a cross-section side view of two flooring apparatuses coupled to an intermediate frame member.

FIG. 11 is a cross-sectional side view of two flooring apparatuses 100 coupled to an intermediate frame member 206 by attachment mechanisms 130. In some embodiments, the attachment mechanisms 130 secure both the elongated member 102 and the insert 106 to the intermediate frame member 206 by extending at least partway through both the elongated member 102 and the insert 106, as shown in FIG. 11. In some embodiments, the attachment mechanisms 130 secure only the elongated member 102 to the intermediate frame member 206 by extending only partway through the elongated member 102 and not into the insert 106.

While the attachment mechanism 130 shown in FIG. 11 is a mechanical attachment mechanism, any suitable attachment mechanism or combination of attachment mechanisms may be used to secure the apparatuses 100 to the a support structure, such as the frame members 206 of a trailer 200. In other embodiments, for example, the apparatuses 100 are secured to a support structure by one or more adhesives, a welded attachment, screws, nails and/or bolts.

As shown in FIG. 11, the flooring apparatuses 100 may be spaced from each other when secured to a support structure, such as the intermediate frame member 206. Spacing the flooring apparatuses 100 in this manner may reduce the number of apparatuses 100 required to cover a floor area.

Figure 12A:
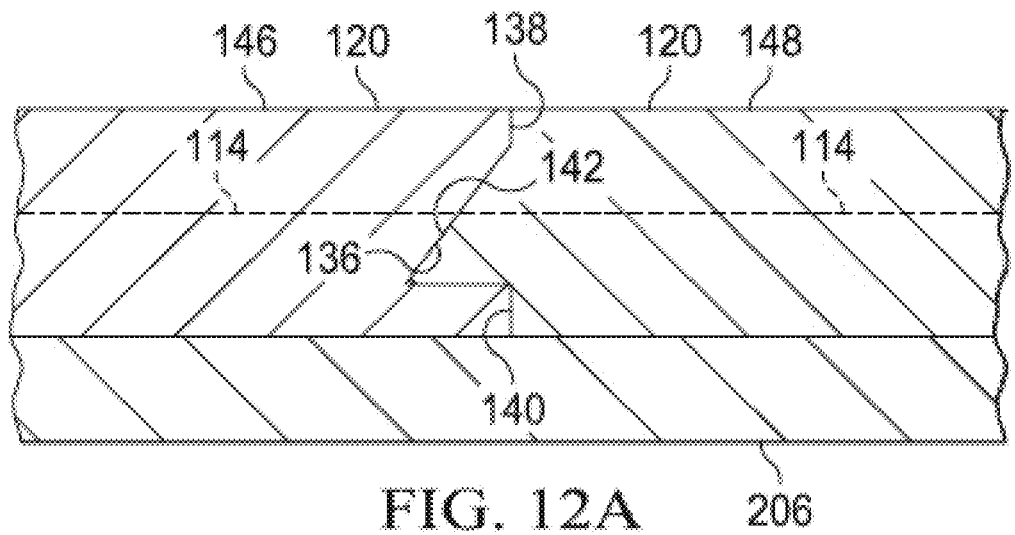
FIG. 12A is a cross-section, side view of a an embodiment of a first elongated member positioned adjacent to a second elongated member.

FIG. 12A is a cross-sectional, side view of a first elongated member 146 positioned adjacent to a second elongated member 148. In some embodiments, multiple elongated members 148 are placed adjacent to each other (i.e., end-to-end) when a single elongated member 102 is not sufficiently long to cover a desired surface, such as a trailer surface. In those embodiments, the elongated members 102 may simply be placed end to end or the elongated members 102 may include a feature to interlock and align the elongated members 102. For example, in some embodiments a first elongated member 146 includes a recess 136 on a first end 138 and a second elongated member 148 includes a protrusion 142 on a second end 140. The protrusion 142 corresponds in shape to the recess 136 so that the protrusion 142 and recess 136 help to align the first and second elongated members 146 and 148. In some embodiments, interlocking engagement of the protrusion 142 and the recess 136 also at least partially seals the intersection of the first and second elongated members 146 and 148 to prevent contaminants from entering between the first and second elongated members 146 and 148.

Figure 12B:
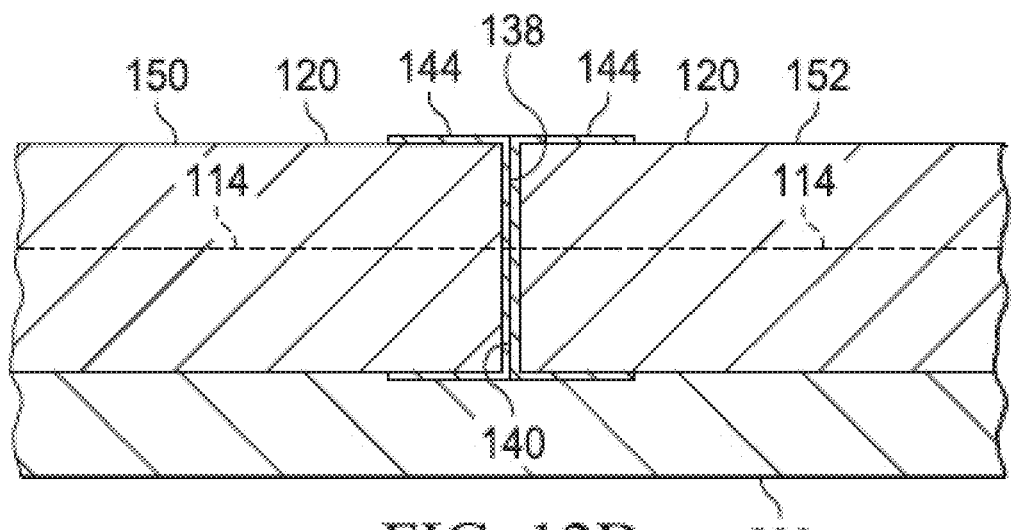
FIG. 12B is a cross-section, side view of an embodiment of a first elongated member with a first cap that is in contact with a second cap of a second elongated member.

FIG. 12B is a cross-sectional, side view of another embodiment of two elongated members 150 and 152 that are aligned end-to-end. The first and second elongated members 150 and 152 each include a cap 144 that protect the ends of the elongated members 150 and 152 and the inserts 106 (not shown) from environmental contaminants. In some embodiments, the caps 144 also include mating recesses and grooves (not shown), similar to the recess 136 and groove 142 described above, to align the elongated members 150 and 152.

While the above description illustrates the use of the apparatus 100 on a trailer 200, the apparatus 100 can also be used as a flooring element for many other types of floors and support structures. For example, the flooring apparatuses 100 can be used as the flooring for a deck of a home, as a safety flooring material for an industrial application, such as an offshore drilling rig, as a material for steps of a staircase, or as flooring on scaffolding, walkways or other elevated pathways. One of skill in the art will recognize other suitable uses for the apparatus 100.

Figure 13:
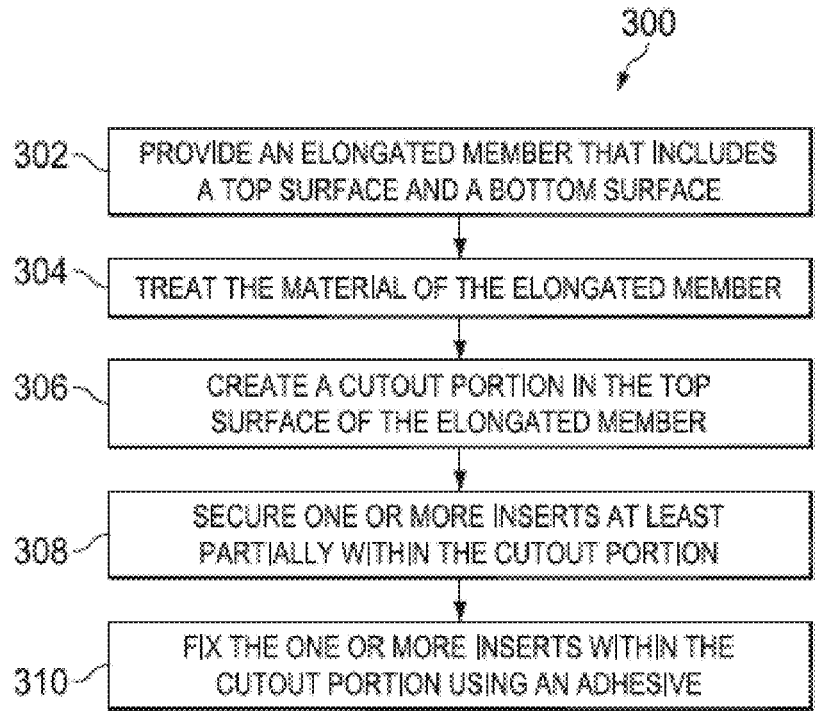
FIG. 13 is a schematic block diagram illustrating a method of manufacturing a flooring apparatus.

Referring now to FIG. 13, an embodiment of a method 300 of manufacturing a flooring apparatus 100 is illustrated. The method 300 includes providing an elongated member 102 that includes a top surface 120 and a bottom surface 122, as provided at block 302. The elongated member 102 may be made of any suitable material, as described above, and may be similar to the elongated member shown in FIG. 1. In some embodiments, the elongated member 102 is made of a wood material, such as pine, and the method 300 includes treating the material of the elongated member 102, as provided at block 304. For example, in some embodiments a wooden elongated member 102 is treated with a chemical, such as, for example, WOLMAN®, made by Lonza, located in Basel, Switzerland. In other embodiments, the elongated member 102 is treated by another suitable treatment chemical or treatment method. For example, in some embodiments, the elongated member 102 is made of wood and is treated with a borate material to form a borate treated wood piece, such as, for example, SILLBORE Borate-Treated Wood made by Lonza, located in Basel, Switzerland. In other embodiments, a wooden elongated member 102 is treated with micronized copper azole (MCA) and/or micronized copper quaternary (MCQ) materials.

A cutout portion 104 is then created in the top surface 120 of the elongated member 102, as provided at block 306. In some embodiments, the cutout portion 104 is made by milling a portion of a wooden elongated member 102. As described above, the cutout portion 104 may extend the entire length of the elongated member 102 or may extend less than the entire length of the elongated member 102. The elongated member 102 may include any number of cutout portions 104 and the cutout portions 104 may extend perpendicular to, parallel to, or at another angle with respect to the longitudinal axis 108 of the elongated member 102.

The method 300 may also include securing one or more inserts 106 at least partially within the cutout portion 104, as provided at block 308. The inserts 106 may be created by extruding a rubber material, cutting a material from a large, pre-formed sheet of the material, molding a material, or any other suitable forming process or combination of processes. In some embodiments, for example, the insert 106 is made from rebonded rubber (i.e., rubber that has been recycled using heat, pressure and a urethane bonding agent) which, in some embodiments, includes one or more pigments to produce an insert 106 of a particular color. In some embodiments, the rebonded rubber material is formed into sheets that are then cut into the shape of the insert 106. In some embodiments, surface texture is also added to the surfaces of the insert 106, for example, by stamping a texture onto the surfaces of the insert 106. In some embodiments, a pigment or other coloring agent is applied to the inserts 106, included in the raw materials used to make the inserts 106 or otherwise incorporated into the inserts 106 to give the inserts 106 a desired color. In some embodiments, the color of the inserts 106 matches the color of the elongated member 102, while in other embodiments the color of the inserts 106 does not match the color of the elongated member 102.

The inserts 106 may be fixed in the cutout portion 104 by inserting an adhesive 126 between the inserts 106 and the cutout portion 104, as provided at block 310. In some embodiments, the inserts 106 may also be secured to the cutout portion 104 by applying one or more mechanical attachment mechanisms to the insert 106 and the elongated member 102, such as, for example, nails, screws or bolts.

Figure 14:
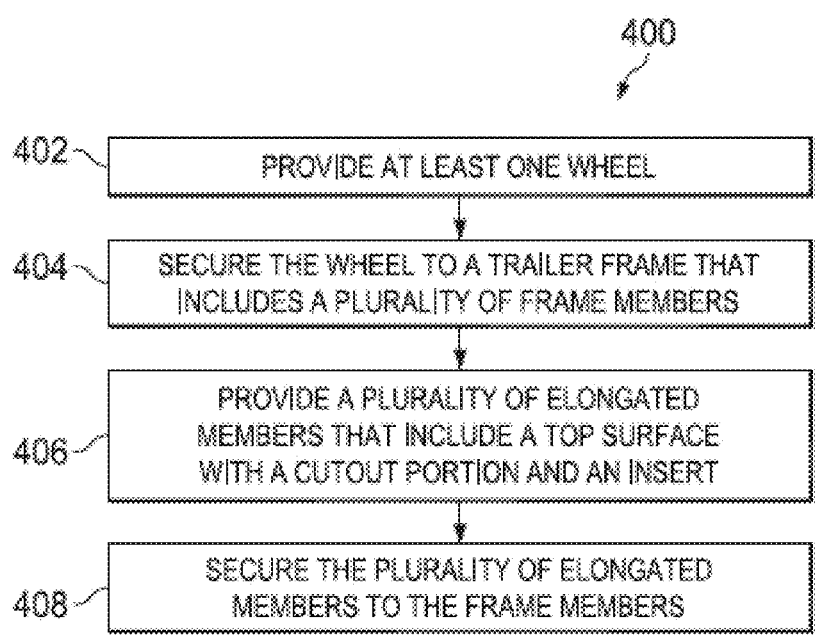
FIG. 14 is a schematic block diagram illustrating a method of manufacturing a trailer using one or more flooring apparatuses.

Referring now to FIG. 14, a method 400 of manufacturing a trailer 200 using one or more flooring apparatuses 100 is also described herein. In some embodiments, the method 400 includes providing at least one wheel 208 and securing the wheel 208 to a frame member 202, 204 or 206 or in a position adjacent to a frame member 202, 204 or 206, as provided at blocks 402 and 404, respectively. As described above, the frame may include a first frame member 202, a second frame member 204 spaced from the first frame member 202, and a plurality of intermediate frame members 206 extending between the first frame member 202 and the second frame member 204. The frame members 202 and 204 and the intermediate frame members 206 may be secured to each other by any suitable attachment mechanism or combination of attachment mechanisms, such as, for example, a welded attachment and/or mechanical fasteners. The trailer 200 may include any suitable configuration of frame members 202, 204 and 206. For example, in some embodiments the intermediate frame members 206 extend only partway between the first and second frame members 202 and 204 and the trailer 200 includes sheet metal or other support materials to form part of the floor of the trailer 200.

The method 400 may also include providing a plurality of elongated members 102 that include a top surface 120 that has a cutout portion 104 and an insert 106, as provided at block 406. The elongated members 102 may be secured to the intermediate frame members 206, the first and/or second frame members 202 and 204, and/or any other portion of the trailer 200 by any suitable attachment mechanisms, such as for example, mechanical fasteners such as bolts, screws or nails, as provided at block 408. Each elongated member 102 may be spaced from the adjacent elongated members 102 or may be placed directly adjacent to other elongated members 102. In some embodiments, an end of the elongated members 102 may be sealed, for example, by securing an end cap 144 on the end of the elongated member 102. In some embodiments, a first elongated member 102 may be aligned with a second elongated member 102 (i.e., an end-to-end alignment) if the elongated members 102 are not be long enough to cover the trailer 500. As described above, the first end 138 of the first elongated member 102 may include a recess 136 and the second end 140 of the second elongated member 102 may include a protrusion 142 that is configured to fit within the recess 136.

Figure 15A:
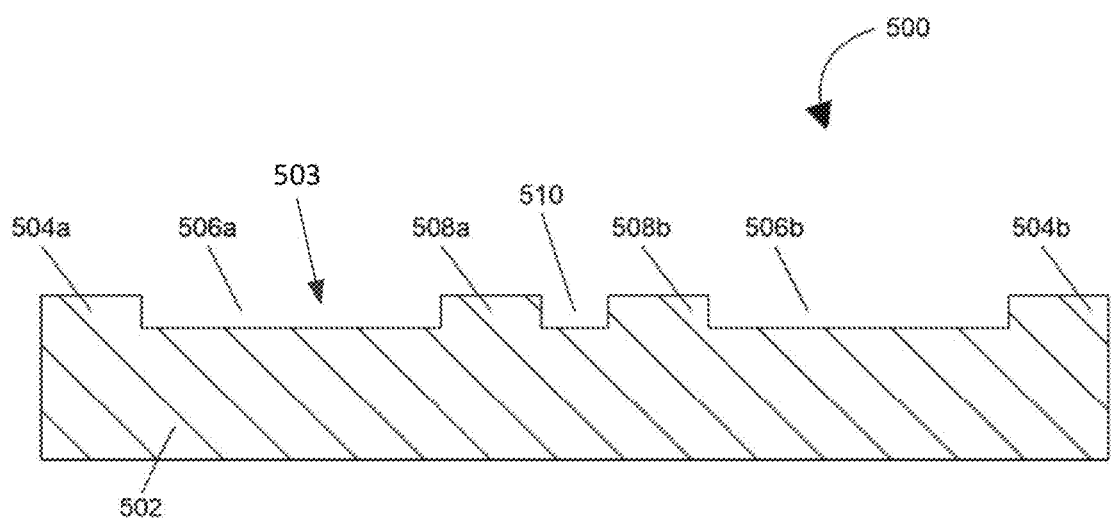
FIGS. 15A, 15B, 15C, and 15D are cross-sectional side views of a further embodiment of an elongated member of a flooring apparatus as it undergoes construction.
Figure 15B:
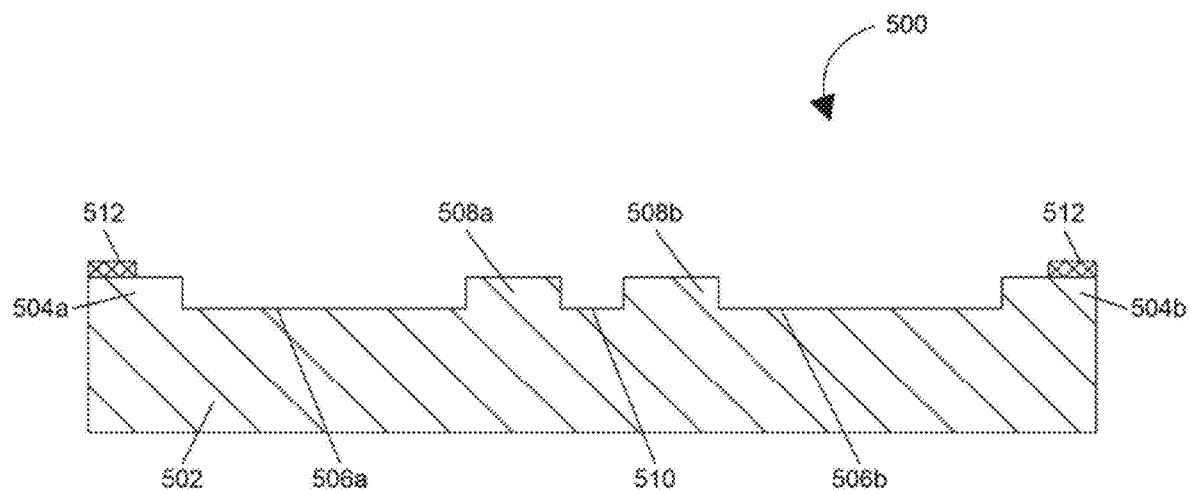
Figure 15C:
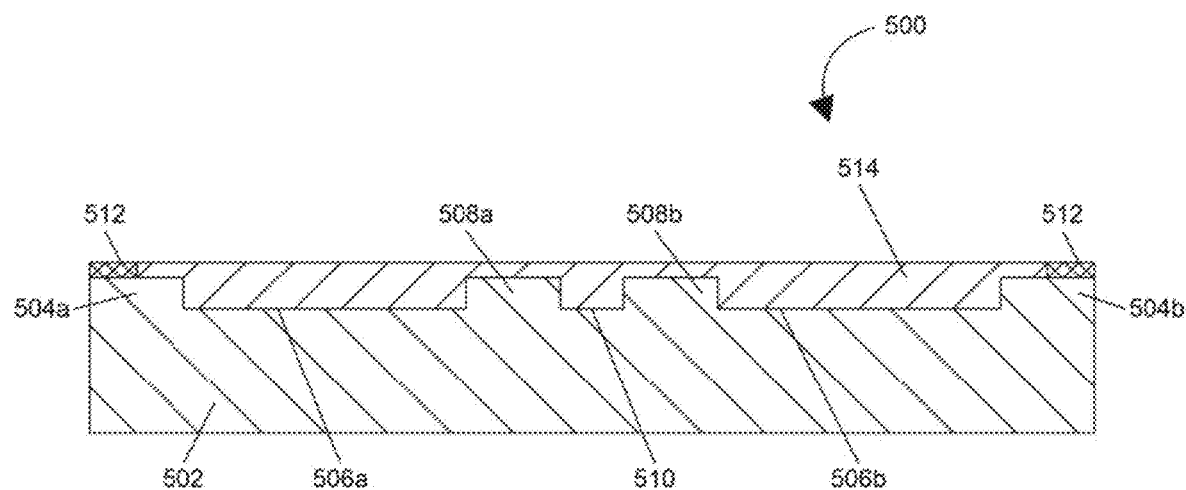
Figure 15D:
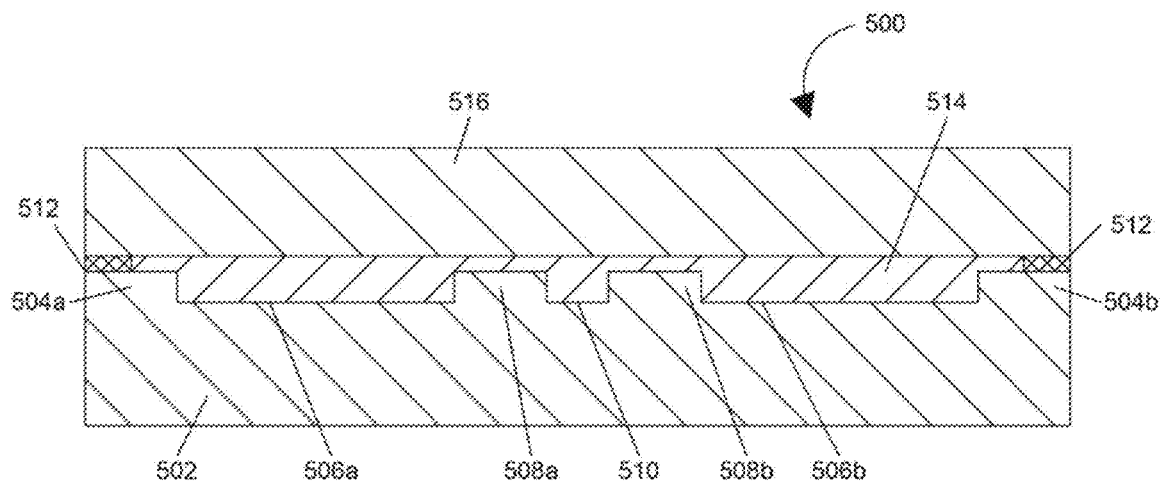
Figure 16:
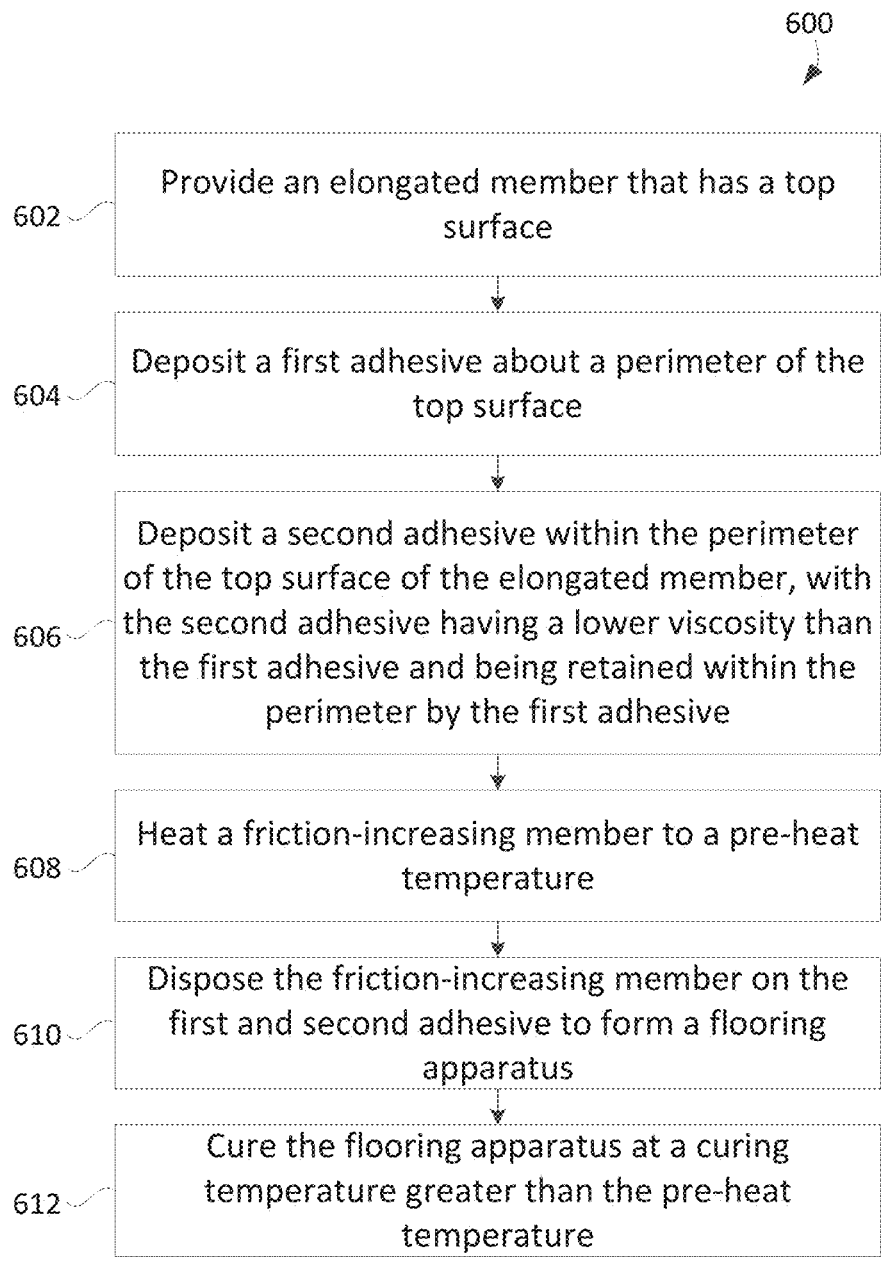
FIG. 16 is a flowchart illustrating a method of manufacturing the flooring apparatus shown in FIG. 15D.

With reference to the flowchart 600 of FIG. 16 and the cross sections of FIGS. 15A-15D and FIG. 16, a method of manufacturing a flooring apparatus 500 is now described. As perhaps best shown in FIG. 15A, the method begins with the providing of an elongated member 502 that has a top surface 503 (Block 602). The elongated member 502 may be constructed, in one embodiment, from a naturally occurring material, such as a wood or a grass like bamboo. In other embodiments, the elongated member 502 may include virtually any other known or desirable material, such as a synthetic, composite, plastic, resign, cement, metal, engineered wood, or other materials.

First and second cutout portions 506a and 506b, in the one embodiment illustrated in FIG. 15A, are formed or provided in the top surface 503 of the elongated member 502 and positioned within the perimeter of the top surface 503 of the elongated member 502. A third cutout portion 510 may be provided or formed between the first and second cutout portions 506a and 506b. The cutout portions 506a, 506b, and 510 thus define or serve as recesses in the top surface 503 of the elongated member 502 while the remaining portions 504a, 504b, 508a, 508b define projections in the top surface 503 of the elongated member 502. The first and second cutout portions 506a and 506b are illustratively shown as having a same width that is greater than the width of the third cutout portion 510, although other width arrangements are intended to be within the scope of this disclosure. Indeed, the cutout portions 506a, 506b, and 510 can each have different widths with respect to one another, and these widths may be greater, equal to, or less than widths of the other cutout portions. In other embodiments, either more or less cutout portions may be provided or formed in the top surface 503 of the elongated member 502.

As shown in FIG. 15B, the method continues with the depositing of a first adhesive 512 generally about the perimeter of the top surface 503 (Block 604). The method then continues with the depositing of a second adhesive 514 generally within the perimeter of the top surface 503 (Block 606), as shown in FIG. 15C. The first adhesive 512, in one embodiment, has a higher viscosity than the second adhesive 514, which may be self-leveling, and thereby serves to retain the second adhesive fully or partially within the perimeter of the top surface.

Although cross sectional views as shown, it should be appreciated that the top surface 503 elongated member 502 has four sides and thus the first adhesive 512 is, in one embodiment, deposited about those four sides. Also, it should be understood that in depositing the first adhesive 512 in the embodiment of the elongated member 502 of FIG. 15 about the perimeter of the top surface 503, the first adhesive 512 is shown deposited outside of the cutout portions 506a, 506b, and 510, and is instead deposited on the surface portions 504a and 504b. In other embodiments, the first adhesive 512 may be deposited partially on the top surface of the surface portions 504a and 504b and partially within the cutout portions 506a and 506b. In addition, the second adhesive 514 is shown positioned or deposited within the cutout portions 506a, 506b, and 510, as well as on top of surface portions 504a, 504b, 508a, and 508b. The increased surface area provided by the cutout portions 506a, 506b, and 510 helps increase the strength of the bond between the elongated member 502 and the first and second adhesives 512, 514. Any other desired modifications to the top surface 503 may be undertaken to help increase the strength of the bond between the elongated member 502 and the first and second adhesives 512, 514. For example, additional projections or recesses (including holes of any depth) may be defined in the top surface 503, and the top surface 503 itself may be roughened or hollowed at desired locations.

Next, a friction-increasing member 516 (shown in FIG. 15D) is, in one embodiment, heated to a pre-heat temperature (Block 608), for example in the range of about 140° F. to about 180° F., and preferably about 160° F. The friction-increasing member 516 is constructed, in one embodiment, from man-made materials, such as a polymer or rubber material or any materials described above in this disclosure, either alone or in combination. This pre-heating of the friction-increasing member 516 may expand the pores or openings in the materials so as to enhance bonding with adhesive. In other embodiments of the method, the friction-increasing member 516 is not preheated.

Once the friction-increasing member 516 is at the pre-heat or desired temperature, it is placed onto the first and second adhesive 512, 514 to form the flooring apparatus 500, albeit in an uncured state (Block 610). As can be appreciated from FIG. 15D, the friction-increasing member 516 generally will have a width greater than that of the cutout portions 506a, 506b, and 510 and fully covers those cutout portions, with the surface portions 508a and 508b providing support to the medial portion of the friction-increasing member 516. It should be understood that the friction-increasing member 516 in some applications may not be wide enough to cover each of the cutout portions 506a, 506b, and 510, and may have a width matching (or not matching) that of the elongated member 502. In addition, it should be understood that there may be multiple friction-increasing members 516 to span across the elongated member 502 as opposed to the single friction-increasing member 516 shown.

Once the friction-increasing member 516 has been placed, the flooring apparatus 500 is then cured in an oven, such as a convection oven, at a curing temperature that is greater than the pre-heat temperature (Block 612), or at a comparable or lower temperature in other embodiments. The curing temperature may be in a range, in one embodiment, of about 200° F. to about 240° F., and preferably about 220° F. The curing may be performed for a time ranging from about 30 seconds to about 3 minutes, and preferably for about 1 minute to 2 minutes. The curing helps strengthen the bond between the adhesives 512 and 514 and the elongated member 502 as well as the friction-increasing member 516.

Once the curing is fully completed or of a sufficient strength, the flooring apparatus 500 is ready for use in a trailer as described above in this disclosure, or in connection with any desired flooring application.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope or spirit of the disclosed embodiments, the embodiments being illustrative and not restrictive.

Furthermore, invention(s) have been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A method comprising:
   providing an elongated member having a top surface;
   depositing a first adhesive generally about a perimeter of the top surface of the elongated member;
   depositing a second adhesive at least partially within the perimeter of the top surface of the elongated member;
   disposing a friction-increasing member on the first and second adhesive to form a flooring apparatus;
   heating the friction-increasing member to a pre-heat temperature before disposing the friction-increasing member on the first and second adhesive to form the flooring apparatus; and
   curing the flooring apparatus.

2. The method of claim 1, wherein the first adhesive and the second adhesive are a same material.

3. The method of claim 1, further comprising assembling a trailer using the flooring apparatus as a section of flooring for the trailer.

4. A method comprising:
   providing an elongated member having a top surface;
   depositing a first adhesive generally about a perimeter of the top surface of the elongated member;
   forming at least one cutout portion in the top surface of the elongated member and positioned within the perimeter thereof, prior to depositing the first adhesive;
   depositing a second adhesive at least partially within the perimeter of the top surface of the elongated member;
   disposing a friction-increasing member on the first and second adhesive to form a flooring apparatus; and
   curing the flooring apparatus.

5. The method of claim 4, wherein the friction-increasing member has a width greater than a width of the at least one cutout portion and is disposed on the first and second adhesive so as to cover the at least one cutout portion.

6. The method of claim 4, wherein the first adhesive is deposited outside of the at least one cutout portion.

7. The method of claim 4, wherein the second adhesive is deposited at least partially within the at least one cutout portion and at least partially outside the at least one cutout portion.

8. The method of claim 4, wherein forming the at least one cutout portion comprises:
   forming first and second cutout portions in the top surface of the elongated member respectively having first and second widths; and
   forming a third cutout portion in the top surface of the elongated member between the first and second cutout portions and having a third width, the third width being less than the first and second widths.

9. The method of claim 8, wherein the friction-increasing member has a fourth width greater than the first, second, and third widths, and is disposed on the first and second adhesive so as to cover the first, second, and third cutout portions; and wherein the top surface of the elongated member between the first and third cutouts and between the third and second cutouts serves to support the friction-increasing member.

10. The method of claim 8, wherein the first and second widths are equal.

11. The method of claim 4, further comprising heating the friction-increasing member to a pre-heat temperature before disposing the friction-increasing member on the first and second adhesive to form the flooring apparatus.

12. A method comprising:
providing an elongated member having a top surface;
depositing a first adhesive generally about a perimeter of the top surface of the elongated member;
depositing a second adhesive at least partially within the perimeter of the top surface of the elongated member;
disposing a friction-increasing member on the first and second adhesive to form a flooring apparatus; and
curing the flooring apparatus,
wherein the second adhesive has a lower viscosity than the first adhesive and is retained within the perimeter by the first adhesive.

13. The method of claim 1, wherein the elongated member is formed from a naturally occurring material; and wherein the friction-increasing member is formed from a man-made material.

\* \* \* \* \*